US010057569B2

(12) United States Patent
Deshpande

(10) Patent No.: US 10,057,569 B2
(45) Date of Patent: Aug. 21, 2018

(54) ALIGNMENT OF PICTURE ORDER COUNT

(71) Applicant: SHARP KABUSHIKI KAISHA, Osaka-shi, Osaka (JP)

(72) Inventor: Sachin G. Deshpande, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 82 days.

(21) Appl. No.: 15/027,968

(22) PCT Filed: Oct. 10, 2014

(86) PCT No.: PCT/JP2014/005183
§ 371 (c)(1),
(2) Date: Apr. 7, 2016

(87) PCT Pub. No.: WO2015/052939
PCT Pub. Date: Apr. 16, 2015

(65) Prior Publication Data
US 2016/0241850 A1    Aug. 18, 2016

Related U.S. Application Data

(60) Provisional application No. 61/889,446, filed on Oct. 10, 2013, provisional application No. 61/892,989, filed on Oct. 18, 2013.

(51) Int. Cl.
*H04N 19/31* (2014.01)
*H04N 19/58* (2014.01)
*H04N 19/70* (2014.01)
*H04N 19/105* (2014.01)

(52) U.S. Cl.
CPC .......... *H04N 19/105* (2014.11); *H04N 19/31* (2014.11); *H04N 19/58* (2014.11); *H04N 19/70* (2014.11)

(58) Field of Classification Search
CPC ....... H04N 19/70; H04N 19/105; H04N 19/31
See application file for complete search history.

(56) References Cited

U.S. PATENT DOCUMENTS

2014/0086324 A1* 3/2014 Ramasubramonian
................................ H04N 19/58
375/240.13

FOREIGN PATENT DOCUMENTS

WO    WO 2013/048311 A1    4/2013
WO    WO 2013/068647 A1    5/2013

OTHER PUBLICATIONS

Bross et al., "High Efficiency Video Coding (HEVC) text specification draft 10 (for FDIS & Last Call)", JCTVC-L1003_v34, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013.
Bross et al., "High efficiency video coding (HEVC) text specification draft 8", JCTVC-J1003_d6, Joint Collaborative Team on Video Coding (JCT-VC) of ITU-T SG16 WP3 and ISO/IEC JTC1/SC29/WG11, 10th Meeting: Stockholm, SE, Jul. 11-20, 2012.

(Continued)

*Primary Examiner* — Obafemi Sosanya
(74) *Attorney, Agent, or Firm* — Birch, Stewart, Kolasch & Birch, LLP

(57) ABSTRACT

A system for encoding and/or decoding video that include picture order counts.

2 Claims, 20 Drawing Sheets

(56) References Cited

OTHER PUBLICATIONS

Chen et al., "High efficiency video coding (HEVC) scalable extension draft 3", JCTVC-N1008_v3, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013.
Chen et al., "MV-HEVC/SHVC HLS: Cross-layer POC alignment", JCTVC-N0244, Joint Collaborative Team on Video Coding (JCT-VC) of ITU-T SG16 WP 3 and ISO/IEC JTC 1/SC 29/WG 11, 14th Meeting: Vienna, AT, Jul. 25-Aug. 2, 2013.
Chen et al., "SHVC Draft Text 1", JCTVC-L1008, Joint Collaborative Team on Video Coding (JCT-VC) of ITU-T SG16 WP3 and ISO/IEC JTC1/SC29/WG11, 12th Meeting: Geneva, CH, Jan. 14-23, 2013.
Chen et al., "SHVC Working Draft 2", JCTVC-M1008_v3, Joint Collaborative Team on Video Coding (JCT-VC) of ITU-T SG16 WP3 and ISO/IEC JTC1/SC29/WG11, 13th Meeting: Incheon, KR, Apr. 18-26, 2013.
Hannuksela et al., "Common specification text for scalable and multi-view extensions (revision of JCTVC-L0188 straw-man text)", JCTVC-L0452r1, JCT3V-C0237r1, Joint Collaborative Team on Video Coding (JCT-VC) / Joint Collaborative Team on 3D Video Coding Extension Development of ITU-T SG 16 WP 3 and ISO/IEC JTC 1/SC 29/WG11, 12th Meeting: Geneva, CH, Jan. 14-23, 2013 / 3rd Meeting: Geneva, CH, Jan. 17-23, 2013.
Hannuksela et al., "Test Model for Scalable Extensions of High Efficiency Video Coding (HEVC)", JCTVC-L0453-spec-text, Joint Collaborative Team on Video Coding (JCT-VC) of ITU-T SG16 WP3 and ISO/IEC JTC1/SC29/WG11, 11th Meeting: Shanghai, CN, Oct. 10-19, 2012.
International Search Report, issued in PCT/JP2014/005183, PCT/ISA/210, dated Dec. 9, 2014.
Ramasubramonian et al., "MV-HEVC/SHVC HLS: On picture order count", JCTVC-O0213v4, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013.
Sachin Deshpande, "On POC Alignment", JCTVC-O0117, WG11 No. m30858, Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013.
Tech et al., "MV-HEVC Draft Text 3 (ISO/IEC 23008-2:201x/PDAM2)", JCT3V-C1004_d3, Joint Collaborative on 3D Video Coding Extension Development of ITU-T SG 16 WP 3 and ISO/IEC JTC 1/SC 29/WG 11, 3rd Meeting: Geneva, CH, Jan. 17-23, 2013.
Tech et al., "MV-HEVC Draft Text 4", JCT3V-D1004-v4, Joint Collaborative Team on 3D Video Coding Extension Development of ITU-T SG 16 WP 3 and ISO/IEC JTC 1/SC 29/WG 11, 4th Meeting: Incheon, KR, Apr. 20-26, 2013.
Tech et al., "MV-HEVC Draft Text 5", JCT3V-E1004-v5, Joint Collaborative Team on 3D Video Coding Extension Development of ITU-T SG 16 WP 3 and ISO/IEC JTC 1/SC 29/WG 11, 5th Meeting: Vienna, AT, Jul. 27-Aug. 2, 2013.
Written Opinion of the International Searching Authority, issued in PCT/JP2014/005183, PCT/ISA/237, dated Dec. 9, 2014.

\* cited by examiner

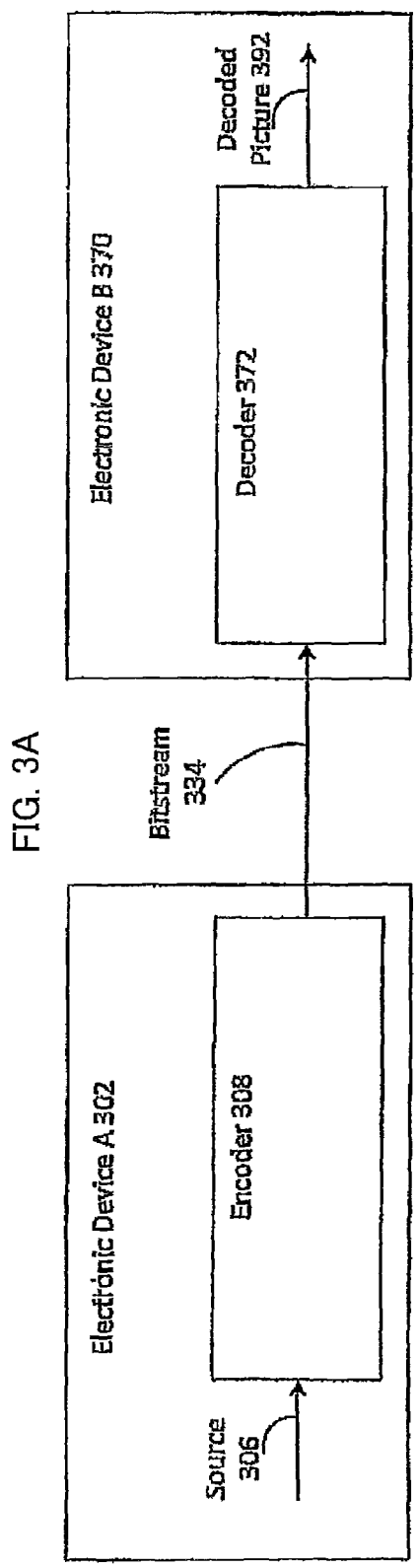

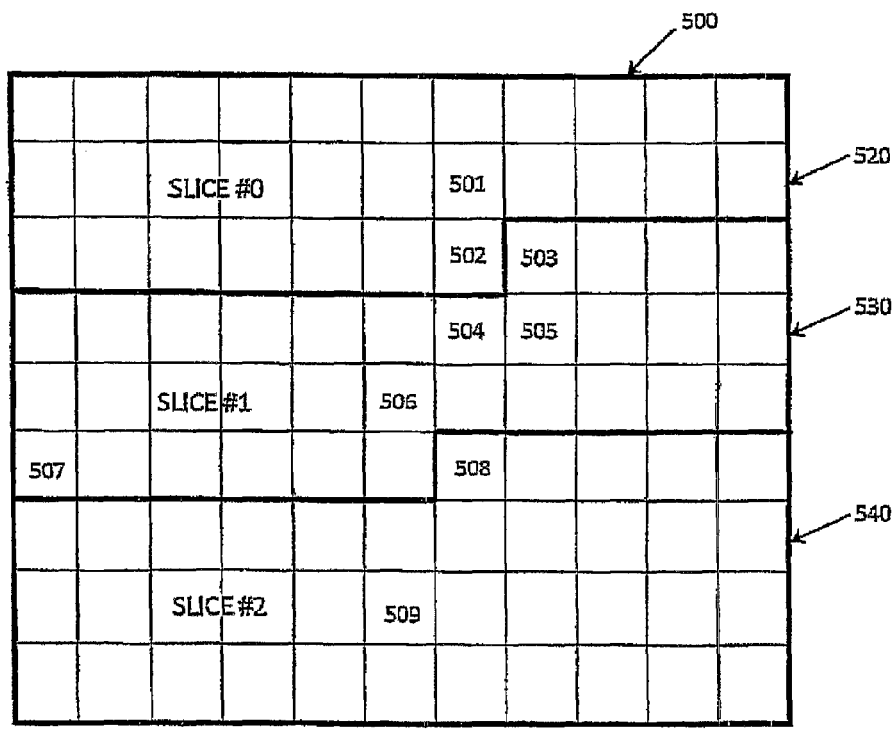

| slice_header( ) { | Descriptor |
|---|---|
| first_slice_in_pic_flag | u(1) |
| if( RapPicFlag ) | |
| no_output_of_prior_pics_flag | u(1) |
| pic_parameter_set_id | ue(v) |
| if( !first_slice_in_pic_flag ) | |
| slice_address | u(v) |
| if( dependent_slice_enabled_flag && !first_slice_in_pic_flag ) | |
| dependent_slice_flag | u(1) |
| if( !dependent_slice_flag ) { | |
| slice_type | ue(v) |
| if( output_flag_present_flag ) | |
| pic_output_flag | u(1) |
| if( separate_colour_plane_flag == 1 ) | |
| colour_plane_id | u(2) |
| pic_order_cnt_lsb | u(v) |
| if( !IdrPicFlag ) { | |
| short_term_ref_pic_set_sps_flag | u(1) |
| if( !short_term_ref_pic_set_sps_flag ) | |
| short_term_ref_pic_set( num_short_term_ref_pic_sets ) | |
| else | |
| short_term_ref_pic_set_idx | u(v) |
| ... | |

SLICE HEADER

FIG. 10

| slice_header( ) { | Descriptor |
|---|---|
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrBlaPicFlag ) { | |
|       pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|     ... | |

SLICE HEADER

FIG. 11

| slice_header( ) { | Descriptor |
|---|---|
| first_slice_in_pic_flag | u(1) |
| if( RapPicFlag ) | |
|   no_output_of_prior_pics_flag | u(1) |
| pic_parameter_set_id | ue(v) |
| if( !first_slice_in_pic_flag ) | |
|   slice_address | u(v) |
| if( dependent_slice_enabled_flag && !first_slice_in_pic_flag ) | |
|   dependent_slice_flag | u(1) |
| if( !dependent_slice_flag ) { | |
|   slice_type | ue(v) |
|   if( output_flag_present_flag ) | |
|     pic_output_flag | u(1) |
|   if( separate_colour_plane_flag == 1 ) | |
|     colour_plane_id | u(2) |
|   if( !IdrBlaPicFlag ) | |
|     pic_order_cnt_lsb | u(v) |
|   if( !IdrPicFlag ) { | |
|     short_term_ref_pic_set_sps_flag | u(1) |
|     if( !short_term_ref_pic_set_sps_flag ) | |
|       short_term_ref_pic_set( num_short_term_ref_pic_sets ) | |
|     else | |
|       short_term_ref_pic_set_idx | u(v) |

SLICE HEADER

FIG. 12

| slice_header( ) { | Descriptor |
|---|---|
|   pic_order_cnt_lsb | u(v) |
|   first_slice_in_pic_flag | u(1) |
|   if( RapPicFlag ) | |
|     no_output_of_prior_pics_flag | u(1) |
|   pic_parameter_set_id | ue(v) |
|   if( !first_slice_in_pic_flag ) | |
|     slice_address | u(v) |
|   if( dependent_slice_enabled_flag && !first_slice_in_pic_flag ) | |
|     dependent_slice_flag | u(1) |
|   if( !dependent_slice_flag ) { | |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( !IdrPicFlag ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else | |
|         short_term_ref_pic_set_idx | u(v) |
|   ... | |

SLICE HEADER

FIG. 13

| video_parameter_set_rbsp() { | Descriptor |
|---|---|
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_extension_offset //vps_reserved_0xffff_16bits | u(16) |
|   profile_tier_level( 1, vps_max_sub_layers_minus1 ) | |
|   vps_sub_layer_ordering_info_present_flag | u(1) |
|   for( i = ( vps_sub_layer_ordering_info_present_flag ? 0 : vps_max_sub_layers_minus1 );<br>    i <= vps_max_sub_layers_minus1; i++ ) { | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_max_layer_id | u(6) |
|   vps_num_layer_sets_minus1 | ue(v) |
|   for( i = 1; i <= vps_num_layer_sets_minus1; i++ ) | |
|     for( j = 0; j <= vps_max_layer_id; j++ ) | |
|       layer_id_included_flag[ i ][ j ] | u(1) |
|   vps_timing_info_present_flag | u(1) |
|   if( vps_timing_info_present_flag ) { | |
|     vps_num_units_in_tick | u(32) |
|     vps_time_scale | u(32) |
|     vps_poc_proportional_to_timing_flag | u(1) |
|     if( vps_poc_proportional_to_timing_flag ) | |
|       vps_num_ticks_poc_diff_one_minus1 | ue(v) |
|     vps_num_hrd_parameters | ue(v) |
|     for( i = 0; i < vps_num_hrd_parameters; i++ ) { | |
|       hrd_layer_set_idx[ i ] | ue(v) |
|       if( i > 0 ) | |
|         cprms_present_flag[ i ] | u(1) |
|       hrd_parameters( cprms_present_flag[ i ], vps_max_sub_layers_minus1 ) | |
|     } | |
|   } | |
|   vps_extension_flag | u(1) |
|   if( vps_extension_flag ) { | |
|     vps_extension() | |
|     vps_extension2_flag | u(1) |
|     if( vps_extension2_flag ) | |
|       while( more_rbsp_data() ) | |
|         vps_extension_data_flag | u(1) |
|   } | |
|   rbsp_trailing_bits() | |
| } | |

ALIGNMENT OF PICTURE ORDER COUNT

CROSS REFERENCE TO RELATED APPLICATIONS

This application is the National Phase of PCT/JP2014/005183 filed on Oct. 10, 2014, which claims priority under 35 U.S.C. § 119(e) to U.S. Provisional Application Nos. 61/889,446 filed on Oct. 10, 2013, and 61/892,989 filed on Oct. 18, 2013, all of which are hereby expressly incorporated by reference into the present application.

CROSS-REFERENCE TO RELATED APPLICATIONS

None.

TECHNICAL FIELD

The present invention relates to video encoding and decoding.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and/or displaying digital media. For example, portable electronic devices now allow for digital media to be produced and/or consumed at almost any location where a consumer may be. Furthermore, some electronic devices may provide download or streaming of digital media content for the use and enjoyment of a consumer.

Digital video is typically represented as a series of images or frames, each of which contains an array of pixels. Each pixel includes information, such as intensity and/or color information. In many cases, each pixel is represented as a set of three colors. Some video coding techniques provide higher coding efficiency at the expense of increasing complexity. Increasing image quality requirements and increasing image resolution requirements for video coding techniques also increase the coding complexity.

The increasing popularity of digital media has presented several problems. For example, efficiently representing high-quality digital media for storage, transmittal, and playback presents several challenges. Techniques that represent digital media more efficiently is beneficial.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method for decoding a video bitstream comprising the steps of: (a) receiving said video bitstream; (b) decoding pictures of said video bitstream, where each of said plurality of pictures is associated with a picture order count value based upon a most significant bit value of said picture order count and a least significant bit value of said picture order count and associated with a maximum picture order count least significant bit value; (c) locating a picture in a decoder picture buffer having said picture order count value the same as a picture order count of a current picture bit-wise ANDed with said maximum picture order count least significant bit value.

BRIEF DESCRIPTION OF DRAWINGS

FIG. 3A is a block diagram illustrating one example of an encoder and a decoder.

FIG. 5 illustrates an exemplary slice structure.

FIG. 6 illustrates a frame with a slice and 9 tiles.

FIG. 9 illustrates an exemplary slice header.

FIG. 10 illustrates an exemplary slice header.

FIG. 11 illustrates an exemplary slice header.

FIG. 12 illustrates an exemplary slice header.

FIG. 13 illustrates an exemplary video parameter set.

DESCRIPTION OF EMBODIMENTS

The Joint Collaborative Team on Video Coding (JCT-VC) of the International Telecommunication Union Telecommunication Standardization Sector (ITU-T) Study Group 16 (SG16) Working Party 3 (WP3) and International Organization for Standardization/International Electrotechnical Commission (ISO/IEC) Joint Technical Committee 1/Subcommittee 29/Working Group 11 (JTC1/SC29/WG11) has launched a standardization effort for a video coding standard called the High Efficiency Video Coding standard (HEVC). HEVC uses block-based coding.

Figure 1A:
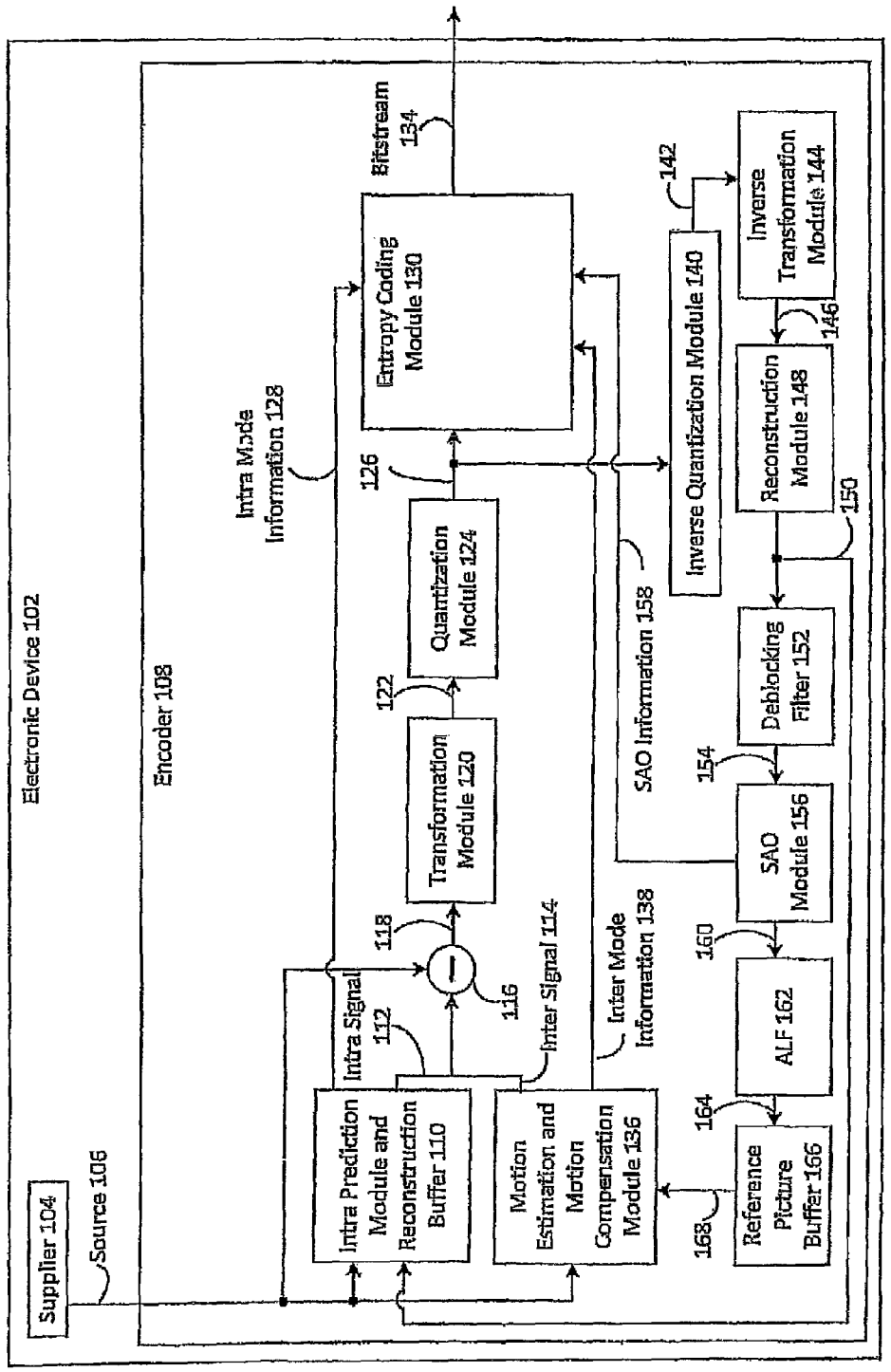
FIG. 1A is a block diagram illustrating one configuration of an electronic device including a HEVC encoder.

FIG. 1A is a block diagram illustrating one configuration of an electronic device 102 in which video may be coded. It should be noted that one or more of the elements illustrated as included within the electronic device 102 may be implemented in hardware, software, or a combination of both. For example, the electronic device 102 includes a encoder 108, which may be implemented in hardware, software or a combination of both. For instance, the encoder 108 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 108 may be a high efficiency video coding (HEVC) coder.

The electronic device 102 may include a supplier 104. The supplier 104 may provide picture or image data (e.g., video) as a source 106 to the encoder 108. Examples of the supplier 104 include image sensors, memory, communication interfaces, network interfaces, wireless receivers, ports, etc.

The source 106 may be provided to an intra-frame prediction module and reconstruction buffer 110. The source 106 may also be provided to a motion estimation and motion compensation module 136 and to a subtraction module 116.

The intra-frame prediction module and reconstruction buffer 110 may generate intra mode information 128 and an intra signal 112 based on the source 106 and reconstructed data 150. The motion estimation and motion compensation module 136 may generate inter mode information 138 and an inter signal 114 based on the source 106 and a reference picture buffer 166 signal 168. The reference picture buffer 166 signal 168 may include data from one or more reference pictures stored in the reference picture buffer 166.

The encoder 108 may select between the intra signal 112 and the inter signal 114 in accordance with a mode. The intra signal 112 may be used in order to exploit spatial characteristics within a picture in an intra coding mode. The inter signal 114 may be used in order to exploit temporal characteristics between pictures in an inter coding mode. While in the intra coding mode, the intra signal 112 may be provided to the subtraction module 116 and the intra mode information 128 may be provided to an entropy coding module 130. While in the inter coding mode, the inter signal 114 may be provided to the subtraction module 116 and the inter mode information 138 may be provided to the entropy coding module 130.

Either the intra signal 112 or the inter signal 114 (depending on the mode) is subtracted from the source 106 at the subtraction module 116 in order to produce a prediction residual 118. The prediction residual 118 is provided to a transformation module 120. The transformation module 120 may compress the prediction residual 118 to produce a transformed signal 122 that is provided to a quantization module 124. The quantization module 124 quantizes the transformed signal 122 to produce transformed and quantized coefficients (TQCs) 126.

The TQCs 126 are provided to an entropy coding module 130 and an inverse quantization module 140. The inverse quantization module 140 performs inverse quantization on the TQCs 126 to produce an inverse quantized signal 142 that is provided to an inverse transformation module 144. The inverse transformation module 144 decompresses the inverse quantized signal 142 to produce a decompressed signal 146 that is provided to a reconstruction module 148.

The reconstruction module 148 may produce reconstructed data 150 based on the decompressed signal 146. For example, the reconstruction module 148 may reconstruct (modified) pictures. The reconstructed data 150 may be provided to a deblocking filter 152 and to the intra prediction module and reconstruction buffer 110. The deblocking filter 152 may produce a filtered signal 154 based on the reconstructed data 150.

The filtered signal 154 may be provided to a sample adaptive offset (SAO) module 156. The SAO module 156 may produce SAO information 158 that is provided to the entropy coding module 130 and an SAO signal 160 that is provided to an adaptive loop filter (ALF) 162. The ALF 162 produces an ALF signal 164 that is provided to the reference picture buffer 166. The ALF signal 164 may include data from one or more pictures that may be used as reference pictures. In some cases the ALF 162 may be omitted.

The entropy coding module 130 may code the TQCs 126 to produce a bitstream 134. As described above, the TQCs 126 may be converted to a 1D array before entropy coding. Also, the entropy coding module 130 may code the TQCs 126 using CAVLC or CABAC. In particular, the entropy coding module 130 may code the TQCs 126 based on one or more of intra mode information 128, inter mode information 138 and SAO information 158. The bitstream 134 may include coded picture data.

Quantization, involved in video compression such as HEVC, is a lossy compression technique achieved by compressing a range of values to a single quantum value. The quantization parameter (QP) is a predefined scaling parameter used to perform the quantization based on both the quality of reconstructed video and compression ratio. The block type is defined in HEVC to represent the characteristics of a given block based on the block size and its color information. QP, resolution information and block type may be determined before entropy coding. For example, the electronic device 102 (e.g., the encoder 108) may determine the QP, resolution information and block type, which may be provided to the entropy coding module 130.

The entropy coding module 130 may determine the block size based on a block of TQCs 126. For example, block size may be the number of TQCs 126 along one dimension of the block of TQCs. In other words, the number of TQCs 126 in the block of TQCs may be equal to block size squared. In addition, the block may be non-square where the number of TQCs 126 is the height times the width of the block. For instance, block size may be determined as the square root of the number of TQCs 126 in the block of TQCs. Resolution may be defined as a pixel width by a pixel height. Resolution information may include a number of pixels for the width of a picture, for the height of a picture or both. Block size may be defined as the number of TQCs along one dimension of a 2D block of TQCs.

In some configurations, the bitstream 134 may be transmitted to another electronic device. For example, the bitstream 134 may be provided to a communication interface, network interface, wireless transmitter, port, etc. For instance, the bitstream 134 may be transmitted to another electronic device via a Local Area Network (LAN), the Internet, a cellular phone base station, etc. The bitstream 134 may additionally or alternatively be stored in memory on the electronic device 102.

Figure 2A:
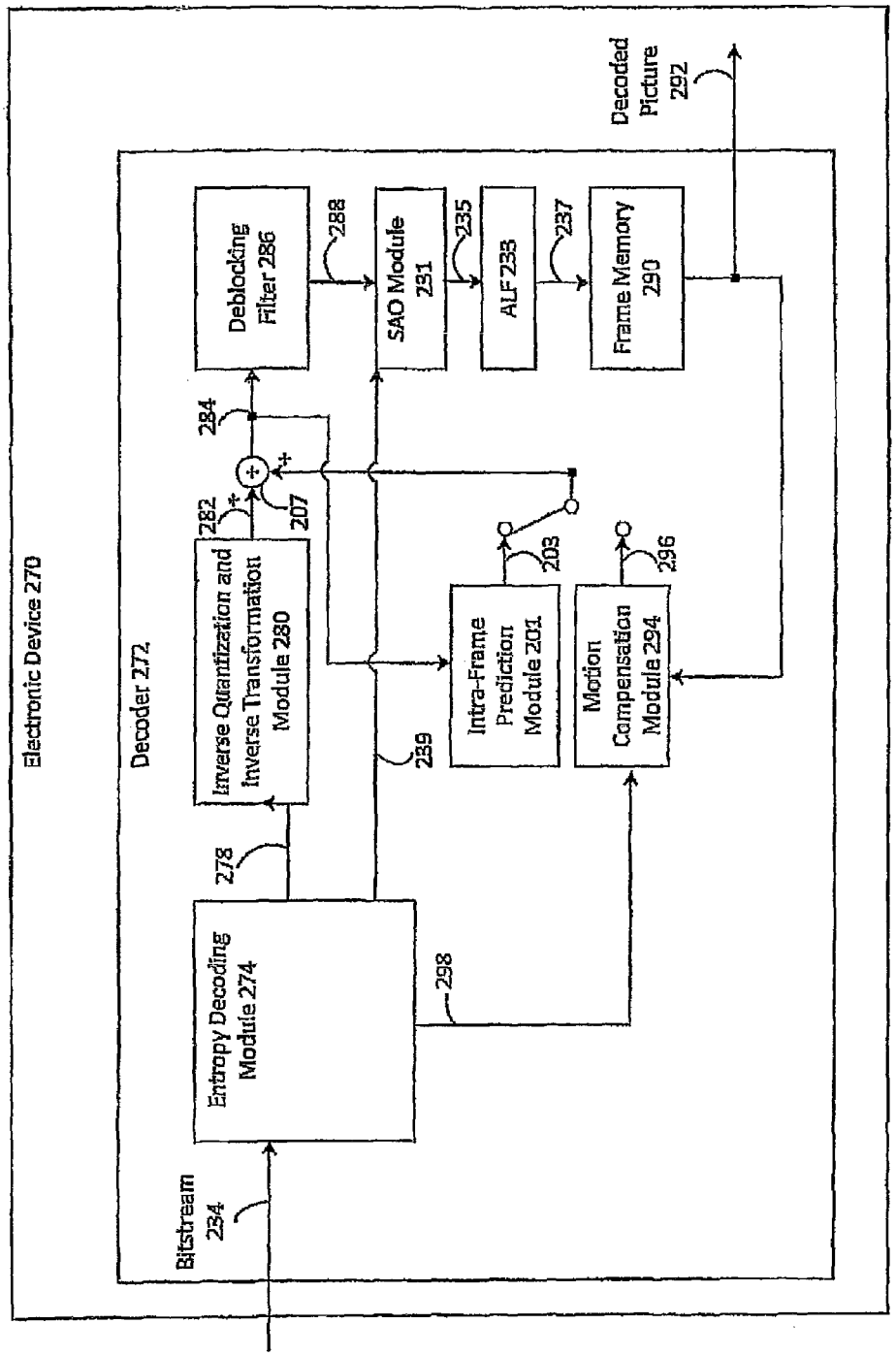
FIG. 2A is a block diagram illustrating one configuration of an electronic device including a HEVC decoder.
Figure 2B:
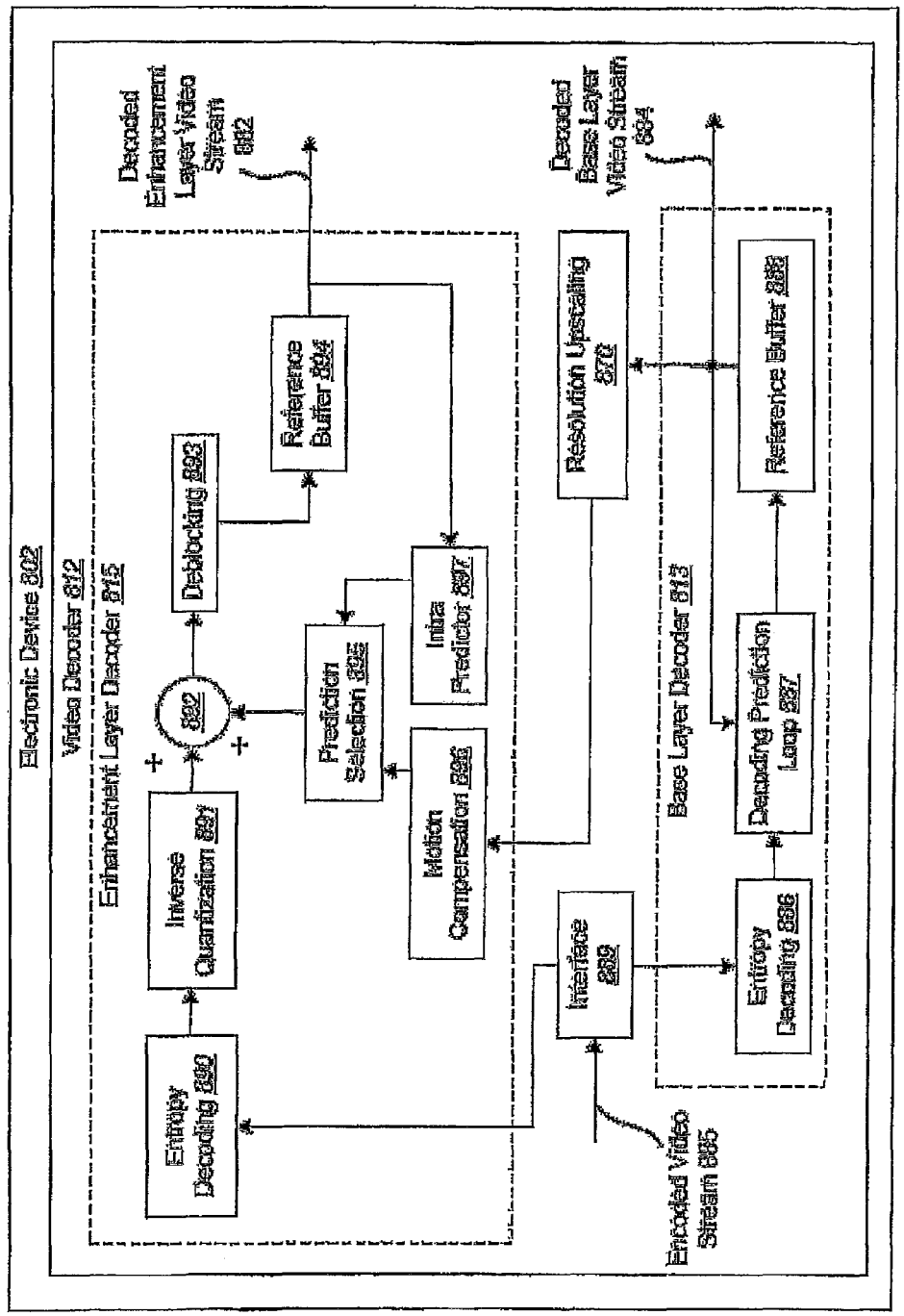
FIG. 2B is a block diagram illustrating one configuration of an electronic device including a HEVC decoder with enhancement layers.

FIG. 2B is a block diagram illustrating one configuration of an electronic device 270 including a decoder 272 that may be a high-efficiency video coding (HEVC) decoder. The decoder 272 and one or more of the elements illustrated as included in the decoder 272 may be implemented in hardware, software or a combination of both. The decoder 272 may receive a bitstream 234 (e.g., one or more coded pictures included in the bitstream 234) for decoding. In some configurations, the received bitstream 234 may include received overhead information, such as a received slice header, received picture parameter set (PPS), received buffer description information, classification indicator, etc.

Received symbols (e.g., encoded TQCs) from the bitstream 234 may be entropy decoded by an entropy decoding module 274. This may produce a motion information signal 298 and decoded transformed and quantized coefficients (TQCs) 278.

The motion information signal 298 may be combined with a portion of a decoded picture 292 from a frame memory 290 at a motion compensation module 294, which may produce an inter-frame prediction signal 296. The decoded transformed and quantized coefficients (TQCs) 278 may be inverse quantized and inverse transformed by an inverse quantization and inverse transformation module 280, thereby producing a decoded residual signal 282. The decoded residual signal 282 may be added to a prediction signal 205 by a summation module 207 to produce a combined signal 284. The prediction signal 205 may be a signal selected from either the inter-frame prediction signal 296 produced by the motion compensation module 294 or an intra-frame prediction signal 203 produced by an intra-frame prediction module 201. In some configurations, this signal selection may be based on (e.g., controlled by) the bitstream 234.

The intra-frame prediction signal 203 may be predicted from previously decoded information from the combined signal 284 (in the current frame, for example). The combined signal 284 may also be filtered by a deblocking filter 286. The resulting filtered signal 288 may be provided to a sample adaptive offset (SAO) module 231. Based on the filtered signal 288 and information 239 from the entropy decoding module 274, the SAO module 231 may produce an SAO signal 235 that is provided to an adaptive loop filter (ALF) 233. The ALF 233 produces an ALF signal 237 that is provided to the frame memory 290. The ALF signal 237 may include data from one or more pictures that may be used as reference pictures. The ALF signal 237 may be written to frame memory 290. The resulting ALF signal 237 may include a decoded picture. In some cases the ALF 233 may be omitted.

The frame memory 290 may include a decoded picture buffer (DPB). The frame memory 290 may also include overhead information corresponding to the decoded pictures. For example, the frame memory 290 may include slice headers, picture parameter set (PPS) information, cycle parameters, buffer description information, etc. One or more of these pieces of information may be signaled from a coder (e.g., encoder 108).

The frame memory 290 may provide one or more decoded pictures 292 to the motion compensation module 294. Furthermore, the frame memory 290 may provide one or more decoded pictures 292, which may be output from the decoder 272. The one or more decoded pictures 292 may be presented on a display, stored in memory or transmitted to another device, for example.

Figure 1B:
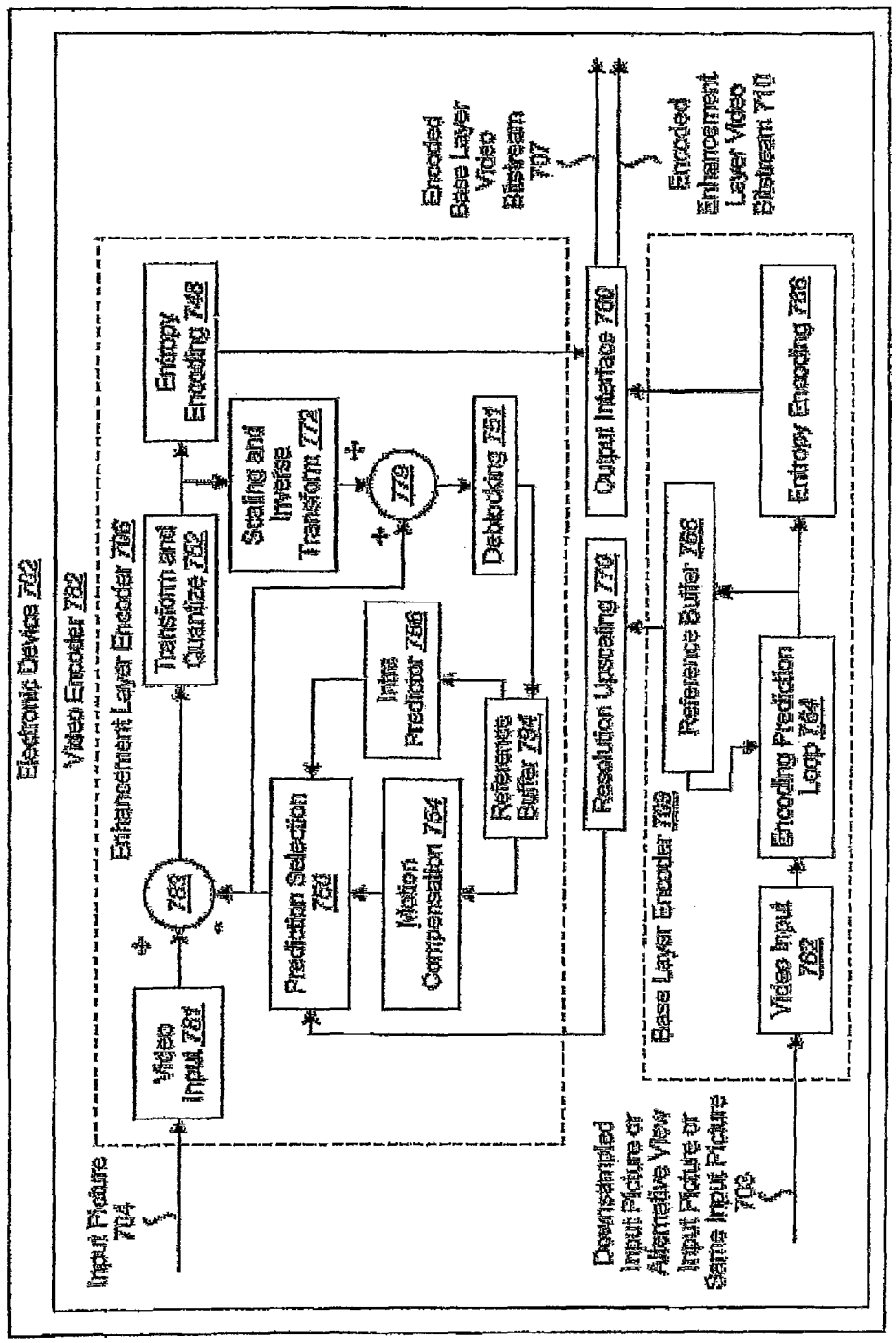
FIG. 1B is a block diagram illustrating one configuration of an electronic device including a HEVC encoder with enhancement layers.

FIG. 1B is a block diagram illustrating one configuration of a video encoder 782 on an electronic device 702. The video encoder 782 of FIG. 1B may be one configuration of the video encoder 108 of FIG. 1A. The video encoder 782 may include an enhancement layer encoder 706, a base layer encoder 709, a resolution upscaling block 770 and an output interface 780. The video encoder of FIG. 1B, for example, is suitable for scalable video coding and multi-view video coding, as described herein.

The enhancement layer encoder 706 may include a video input 781 that receives an input picture 704. The output of the video input 781 may be provided to an adder/subtractor 783 that receives an output of a prediction selection 750. The output of the adder/subtractor 783 may be provided to a transform and quantize block 752. The output of the transform and quantize block 752 may be provided to an entropy encoding 748 block and a scaling and inverse transform block 772. After entropy encoding 748 is performed, the output of the entropy encoding block 748 may be provided to the output interface 780. The output interface 780 may output both the encoded base layer video bitstream 707 and the encoded enhancement layer video bitstream 710.

The output of the scaling and inverse transform block 772 may be provided to an adder 779. The adder 779 may also receive the output of the prediction selection 750. The output of the adder 779 may be provided to a deblocking block 751. The output of the deblocking block 751 may be provided to a reference buffer 794. An output of the reference buffer 794 may be provided to a motion compensation block 754. The output of the motion compensation block 754 may be provided to the prediction selection 750. An output of the reference buffer 794 may also be provided to an intra predictor 756. The output of the intra predictor 756 may be provided to the prediction selection 750. The prediction selection 750 may also receive an output of the resolution upscaling block 770.

The base layer encoder 709 may include a video input 762 that receives a downsampled input picture, or other image content suitable for combing with another image, or an alternative view input picture or the same input picture 703 (i.e., the same as the input picture 704 received by the enhancement layer encoder 706). The output of the video input 762 may be provided to an encoding prediction loop 764. Entropy encoding 766 may be provided on the output of the encoding prediction loop 764. The output of the encoding prediction loop 764 may also be provided to a reference buffer 768. The reference buffer 768 may provide feedback to the encoding prediction loop 764. The output of the reference buffer 768 may also be provided to the resolution upscaling block 770. Once entropy encoding 766 has been performed, the output may be provided to the output interface 780.

FIG. 2B is a block diagram illustrating one configuration of a video decoder 812 on an electronic device 802. The video decoder 812 of FIG. 2B may be one configuration of the video decoder 272 of FIG. 2A. The video decoder 812 may include an enhancement layer decoder 815 and a base layer decoder 813. The video decoder 812 may also include an interface 889 and resolution upscaling 870. The video decoder of FIG. 2B, for example, is suitable for scalable video coding and multi-view video encoded, as described herein.

The interface 889 may receive an encoded video stream 885. The encoded video stream 885 may consist of base layer encoded video stream and enhancement layer encoded video stream. These two streams may be sent separately or together. The interface 889 may provide some or all of the encoded video stream 885 to an entropy decoding block 886 in the base layer decoder 813. The output of the entropy decoding block 886 may be provided to a decoding prediction loop 887. The output of the decoding prediction loop 887 may be provided to a reference buffer 888. The reference buffer may provide feedback to the decoding prediction loop 887. The reference buffer 888 may also output the decoded base layer video stream 884.

The interface 889 may also provide some or all of the encoded video stream 885 to an entropy decoding block 890 in the enhancement layer decoder 815. The output of the entropy decoding block 890 may be provided to an inverse quantization block 891. The output of the inverse quantization block 891 may be provided to an adder 892. The adder 892 may add the output of the inverse quantization block 891 and the output of a prediction selection block 895. The output of the adder 892 may be provided to a deblocking block 893. The output of the deblocking block 893 may be provided to a reference buffer 894. The reference buffer 894 may output the decoded enhancement layer video stream 882. The output of the reference buffer 894 may also be provided to an intra predictor 897. The enhancement layer decoder 815 may include motion compensation 896. The motion compensation 896 may be performed after the resolution upscaling 870. The prediction selection block 895 may receive the output of the intra predictor 897 and the output of the motion compensation 896.

FIG. 3A is a block diagram illustrating one example of an encoder 308 and a decoder 372. In this example, electronic device A 302 and electronic device B 370 are illustrated. However, it should be noted that the features and functionality described in relation to electronic device A 302 and electronic device B 370 may be combined into a single electronic device in some configurations.

Electronic device A 302 includes the encoder 308. The encoder 308 may be implemented in hardware, software or a combination of both. In one configuration, the encoder 308 may be a high-efficiency video coding (HEVC) coder. Other coders may likewise be used. Electronic device A 302 may obtain a source 306. In some configurations, the source 306 may be captured on electronic device A 302 using an image sensor, retrieved from memory or received from another electronic device.

The encoder 308 may code the source 306 to produce a bitstream 334. For example, the encoder 308 may code a series of pictures (e.g., video) in the source 306. The encoder 308 may be similar to the encoder 108 described above in connection with FIG. 1A.

The bitstream 334 may include coded picture data based on the source 306. In some configurations, the bitstream 334 may also include overhead data, such as slice header information, PPS information, etc. As additional pictures in the source 306 are coded, the bitstream 334 may include one or more coded pictures.

The bitstream 334 may be provided to the decoder 372. In one example, the bitstream 334 may be transmitted to electronic device B 370 using a wired or wireless link. In some cases, this may be done over a network, such as the Internet or a Local Area Network (LAN). As illustrated in FIG. 3A, the decoder 372 may be implemented on electronic device B 370 separately from the encoder 308 on electronic device A 302. However, it should be noted that the encoder 308 and decoder 372 may be implemented on the same electronic device in some configurations. In an implementation where the encoder 308 and decoder 372 are implemented on the same electronic device, for instance, the bitstream 334 may be provided over a bus to the decoder 372 or stored in memory for retrieval by the decoder 372. The decoder 372 may provide a decoded picture 392 output.

The decoder 372 may be implemented in hardware, software or a combination of both. In one configuration, the decoder 372 may be a high-efficiency video coding (HEVC) decoder. Other decoders may likewise be used. The decoder 372 may be similar to the decoder 272 described above in connection with FIG. 2A.

Figure 3B:
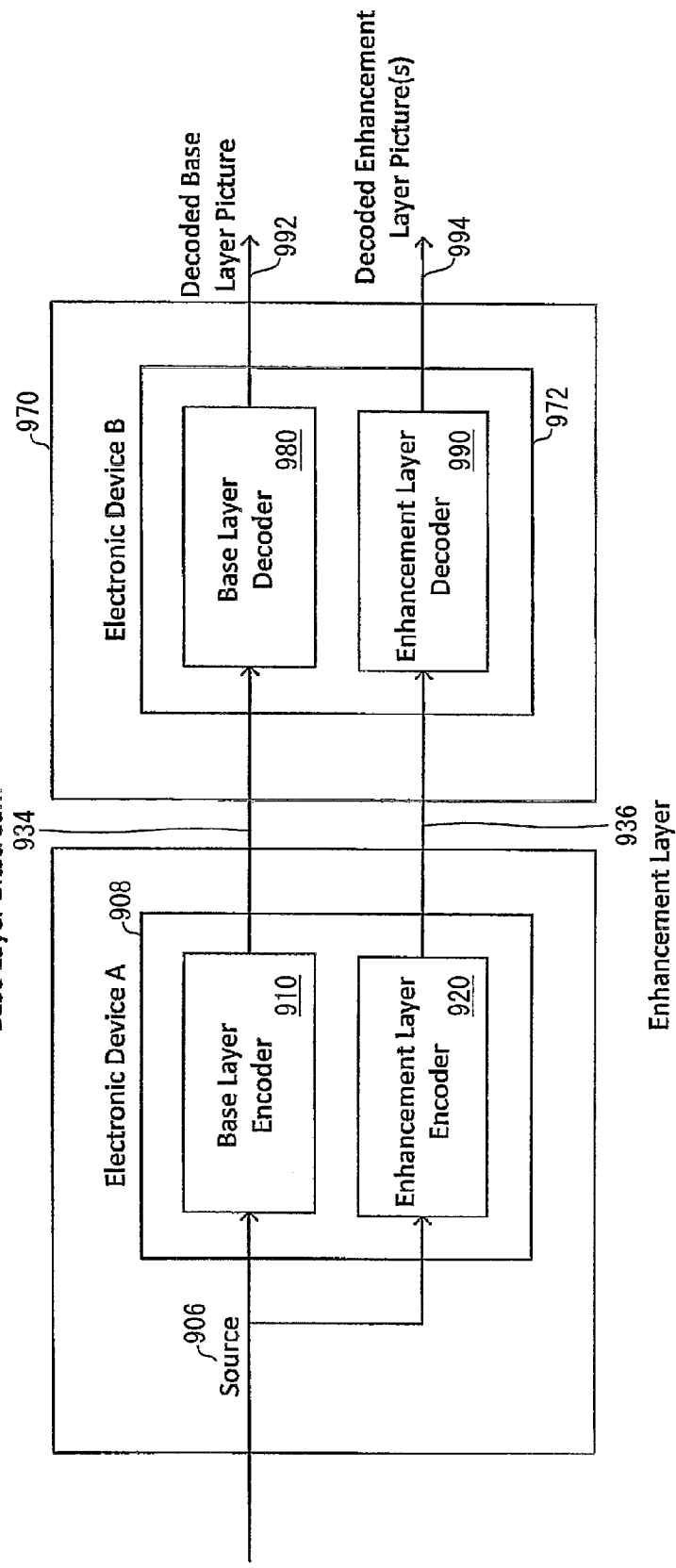
FIG. 3B is a block diagram illustrating one example of an encoder and a decoder with enhancement layers.

FIG. 3B is a block diagram illustrating another example of an ecoder 908 and a decoder 972. In this example, electronic device A 902 and electronic device B 970 are illustrated. However, it should be noted that the features and functionality described in relation to electronic device A 902 and electronic device B 970 may be combined into a single electronic device in some configurations.

Electronic device A 902 includes the encoder 908. The encoder 908 may include a base layer encoder 910 and an enhancement layer encoder 920. The video encoder 908 is suitable for scalable video coding and multi-view video coding. The encoder 908 may be implemented in hardware, software or a combination of both. In one configuration, the encoder 908 may be a high-efficiency video coding (HEVC) coder, including scalable and/or multi-view. Other coders may likewise be used. Electronic device A 902 may obtain a source 906. In some configurations, the source 906 may be captured on electronic device A 902 using an image sensor, retrieved from memory or received from another electronic device.

The encoder 908 may code the source 906 to produce a base layer bitstream 934 and an enhancement layer bitstream 936. For example, the encoder 908 may code a series of pictures (e.g., video) in the source 906. In particular, for scalable video encoding for SNR scalability also known as quality scalability the same source 906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 908 may be similar to the encoder 782 described above in connection with FIG. 1B.

The bitstreams 934, 936 may include coded picture data based on the source 906. In some configurations, the bitstreams 934, 936 may also include overhead data, such as slice header information, PPS information, etc. As additional pictures in the source 906 are coded, the bitstreams 934, 936 may include one or more coded pictures.

The bitstreams 934, 936 may be provided to the decoder 972. The decoder 972 may include a base layer decoder 980 and an enhancement layer decoder 990. The video decoder 972 is suitable for scalable video decoding and multi-view video decoding. In one example, the bitstreams 934, 936 may be transmitted to electronic device B 970 using a wired or wireless link. In some cases, this may be done over a network, such as the Internet or a Local Area Network (LAN). As illustrated in FIG. 3B, the decoder 972 may be implemented on electronic device B 970 separately from the encoder 908 on electronic device A 902. However, it should be noted that the encoder 908 and decoder 972 may be implemented on the same electronic device in some configurations. In an implementation where the encoder 908 and decoder 972 are implemented on the same electronic device, for instance, the bitstreams 934, 936 may be provided over a bus to the decoder 972 or stored in memory for retrieval by the decoder 972. The decoder 972 may provide a decoded base layer 992 and decoded enhancement layer picture(s) 994 as output.

The decoder 972 may be implemented in hardware, software or a combination of both. In one configuration, the decoder 972 may be a high-efficiency video coding (HEVC) decoder, including scalable and/or multi-view. Other decoders may likewise be used. The decoder 972 may be similar to the decoder 812 described above in connection with FIG. 2B.

Figure 4:
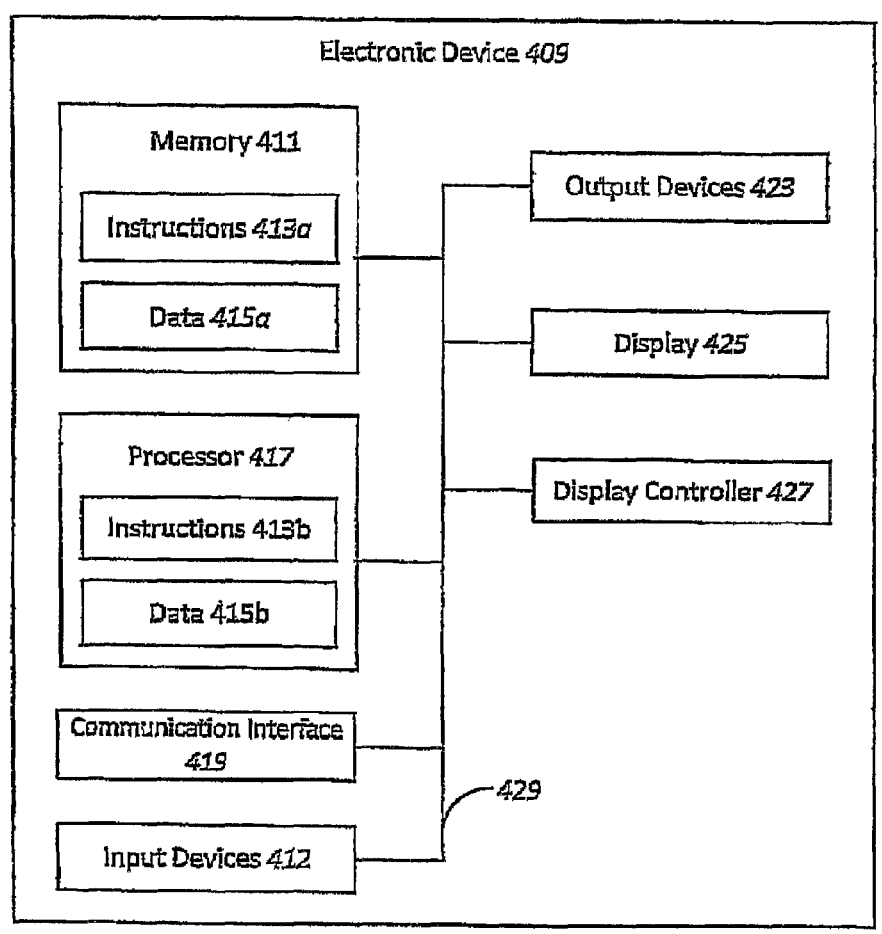
FIG. 4 illustrates various components that may be utilized in an electronic device.

FIG. 4 illustrates various components that may be utilized in an electronic device 409. The electronic device 409 may be implemented as one or more of the electronic devices. For example, the electronic device 409 may be implemented as the electronic device 102 described above in connection with FIG. 1A and FIG. 1B, as the electronic device 270 described above in connection with FIG. 2A and FIG. 2B, or both.

The electronic device 409 includes a processor 417 that controls operation of the electronic device 409. The processor 417 may also be referred to as a CPU. Memory 411, which may include both read-only memory (ROM), random access memory (RAM) or any type of device that may store information, provides instructions 413a (e.g., executable instructions) and data 415a to the processor 417. A portion of the memory 411 may also include non-volatile random access memory (NVRAM). The memory 411 may be in electronic communication with the processor 417.

Instructions 413b and data 415b may also reside in the processor 417. Instructions 413b and/or data 415b loaded into the processor 417 may also include instructions 413a and/or data 415a from memory 411 that were loaded for execution or processing by the processor 417. The instructions 413b may be executed by the processor 417 to implement one or more techniques disclosed herein.

The electronic device 409 may include one or more communication interfaces 419 for communicating with other electronic devices. The communication interfaces 419 may be based on wired communication technology, wireless communication technology, or both. Examples of communication interfaces 419 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with $3^{rd}$ Generation Partnership Project (3GPP) specifications and so forth.

The electronic device 409 may include one or more output devices 423 and one or more input devices 421. Examples of output devices 423 include a speaker, printer, etc. One type of output device that may be included in an electronic device 409 is a display device 425. Display devices 425 used with configurations disclosed herein may utilize any suitable image projection technology, such as a cathode ray tube (CRT), liquid crystal display (LCD), light-emitting diode (LED), gas plasma, electroluminescence or the like. A display controller 427 may be provided for converting data stored in the memory 411 into text, graphics, and/or moving images (as appropriate) shown on the display 425. Examples of input devices 421 include a keyboard, mouse, microphone, remote control device, button, joystick, trackball, touchpad, touchscreen, lightpen, etc.

The various components of the electronic device 409 are coupled together by a bus system 429, which may include a power bus, a control signal bus and a status signal bus, in addition to a data bus. However, for the sake of clarity, the various buses are illustrated in FIG. 4 as the bus system 429. The electronic device 409 illustrated in FIG. 4 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers. The code for the decoder and/or encoder may be stored on a computer readable medium.

An input picture comprising a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

FIG. 5 illustrates an exemplary video picture 500 comprising eleven blocks in the horizontal direction and nine blocks in the vertical direction (nine exemplary blocks labeled 501-509). FIG. 5 illustrates three exemplary slices: a first slice denoted "SLICE #0" 520, a second slice denoted "SLICE #1" 530 and a third slice denoted "SLICE #2" 540. The decoder may decode and reconstruct the three slices 520, 530, 540, in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 503, in "SLICE #1", blocks (for example, blocks labeled 501 and 502) in "SLICE #0" may not be used for context model selection or reconstruction. Whereas, for a block, for example, the block labeled 505, in "SLICE #1," other blocks (for example, blocks labeled 503 and 504) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Referring to FIG. 6, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 6. In some embodiments, blocks located in different tiles are not available for intra-prediction, motion compensation, entropy coding context selection or other processes that rely on neighboring block information.

Figure 7:
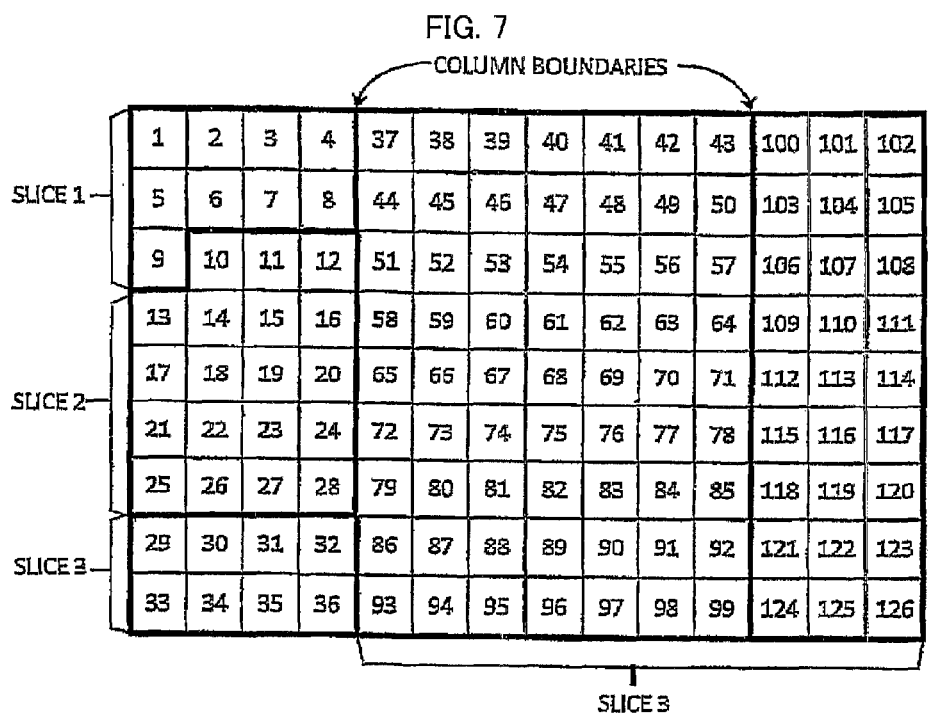
FIG. 7 illustrates a frame with three slices and 3 tiles.

Referring to FIG. 7, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

It is to be understood that in some cases the video coding may optionally not include tiles, and may optionally include the use of a wavefront encoding/decoding pattern for the frames of the video. In this manner, one or more lines of the video (such as a plurality of groups of one or more rows of macroblocks (or alternatively coded tree blocks), each of which group being representative of a wavefront substream may be encoded/decoded in a parallel fashion. In general, the partitioning of the video may be constructed in any suitable manner.

Video coding standards often compress video data for transmission over a channel with limited frequency bandwidth and/or limited storage capacity. These video coding standards may include multiple coding stages such as intra prediction, transform from spatial domain to frequency domain, quantization, entropy coding, motion estimation, and motion compensation, in order to more effectively encode and decode frames. Many of the coding and decoding stages are unduly computationally complex.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of random access decodable leading picture, coded slice of random access skipped leading picture, video parameter set, sequence parameter set, picture parameter set, access unit delimiter, end of sequence, end of bitstream, filler data, and/or sequence enhancement information message. Table 1 below illustrates one example of NAL unit codes and NAL unit type classes. Other NAL unit types may be included, as desired. It should also be understood that the NAL unit type values for the NAL units shown in the Table 1 may be reshuffled and reassigned. Also additional NAL unit types may be added. Also some NAL unit types may be removed.

TABLE 1

NAL unit type codes and NAL unit type classes

| nal_unit_type | Name of nal_unit_type | Content of NAL unit and RBSP syntax structure | NAL unit type class |
| --- | --- | --- | --- |
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a | VCL |

TABLE 1-continued

NAL unit type codes and NAL unit type classes

| nal_unit_type | Name of nal_unit_type | Content of NAL unit and RBSP syntax structure | NAL unit type class |
| --- | --- | --- | --- |
| 3 | TSA_R | TSA picture slice_segment_layer_rbsp( ) | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24..31 | RSV_VCL24.. RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41..47 | RSV_NVCL41.. RSV_NVCL47 | Reserved | non-VCL |
| 48..63 | UNSPEC48.. UNSPEC63 | Unspecified | non-VCL |

The NAL provides the capability to map the video coding layer (VCL) data that represents the content of the pictures onto various transport layers. The NAL units may be classified into VCL and non-VCL NAL units according to whether they contain coded picture or other associated data, respectively. B. Bros, W-J. Han, J-R. Ohm, G. J. Sullivan, and T-. Wiegand, "High efficiency video coding (HEVC) text specification draft 8," JCTVC-J10003, Stockholm, July 2012 is hereby incorporated by reference herein in its entirety. B. Bros, W-J. Han, J-R. Ohm, G. J. Sullivan, Wang, and T-. Wiegand, "High efficiency video coding (HEVC) text specification draft 10 (for DFIS & Last Call)," JCTVC- J10003_v34, Geneva, January 2013 is hereby incorporated by reference herein in its entirety. B. Bros, W-J. Han, J-R. Ohm, G. J. Sullivan, Wang, and T-. Wiegand, "High efficiency video coding (HEVC) text specification draft 10," JCTVC-L1003, Geneva, January 2013 is hereby incorporated by reference herein in its entirety.

To enable random access and bitstream splicing an IDR access unit contains an intra picture, namely, a coded picture that can be decoded without decoding any previous pictures in the NAL unit stream. Also, the presence of an IDR access unit indicates that no subsequent picture in the bitstream will require reference to pictures prior to the intra picture that it contains in order to be decoded.

An IDR access unit may refer to an IDR picture which contains only I slices, and may be the first picture in the bitstream in decoding order, or may appear later in the bitstream. Each IDR picture is the first picture of a coded video sequence (CVS) in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

A BLA access unit may refer to a BLA picture which contains only I slices, and may be the first picture in the bitstream in decoding order, or may appear later in the bitstream. Each BLA picture may begin a new CVS, and has the same effect on the decoding process as an IDR picture. However, a BLA picture contains syntax elements that specify a non-empty RPS. When a BLA picture for which each VCL NAL unit has nal_unit_type equal to BLA_W_LP, it may have associated RASL pictures, which are not output by the decoder and may not be decodable, as they may contain references to pictures that are not present in the bitstream. When a BLA picture for which each VCL NAL unit has nal_unit_type equal to BLA_W_LP, it may also have associated RADL pictures, which are specified to be decoded. When a BLA picture for which each VCL NAL unit has nal_unit_type equal to BLA_W_RADL, it does not have associated RASL pictures but may have associated RADL pictures. When a BLA picture for which each VCL NAL unit has nal_unit_type equal to BLA_N_LP, it does not have any associated leading pictures.

The clean random access (CRA) picture syntax specifies the use of an intra picture at the location of a random access point (RAP), i.e. a location in a bitstream at which a decoder can begin successfully decoding pictures without needing to decode any pictures that appeared earlier in the bitstream. The support of random access enables effective channel switching, seek operations, and dynamic streaming services. Some pictures that follow a CRA picture in decoding order and precede it in display order (output order) may contain inter-picture prediction references to pictures that are not available at the decoder when starting decoding at the CRA picture. These non-decodable pictures are discarded by a decoder that starts its decoding process at a CRA point. Such non-decodable pictures are identified as random access skipped leading (RASL) pictures. The location of splice points from different original coded bitstreams can be indicated by broken link access (BLA) pictures. A bitstream splicing operation can be performed by changing the NAL unit type of a CRA picture in one bitstream to the value that indicates a BLA picture and concatenating the new bitstream at the position of a RAP picture in the other bitstream. A RAP picture may be an IDR, a CRA, or a BLA picture, and both the CRA and BLA pictures may be followed by RASL pictures in the bitstream (depending on the particular value of the NAL unit type used for a BLA picture) and concatenating the new bitstream at the position of a RAP picture in the other bitstream. Any RASL pictures associated with a BLA picture are discarded by the decoder, as they may contain references to pictures that are not actually present in the bitstream due to a splicing operation. The other type of picture that can follow a RAP picture in decoding order and precede it in output order is the random access decodable leading picture (RADL), which cannot contain references to any pictures that precede the RAP picture in decoding order. RASL and RADL pictures are collectively referred to as leading pictures (LPs). Pictures that follow a RAP picture in both decoding order and output order, are known as trailing pictures, which cannot contain references to LPs for inter-picture prediction.

For multiple-reference picture management, a particular set of previously-decoded pictures needs to be present in the decoded picture buffer (DPB) (see, reference picture buffer 166 of FIG. 1A and frame memory 290 of FIG. 2A) for the decoding of the remainder of the pictures in the bitstream. To identify these pictures, a list of picture order count (POC) identifiers is transmitted in each slice header. The pic_order_cnt_lsb syntax element specifies the picture order count modulo MaxPicOrderCntLsb for the current picture. The length of the pic_order_cnt_lsb syntax element is log 2_max_pic_order_cnt_lsb_minus4+4 bits. The value of the pic_order_cnt_lsb is in the range of 0 to MaxPicOrderCntLsb−1, inclusive. The log 2_max_pic_order_cnt_lsb_minus4 specifies the value of the variable MaxPicOrderCntLsb that is used in the decoding process for picture order count as follows:

$$\text{MaxPicOrderCntLsb} = 2^{(\log 2\_max\_pic\_order\_cnt\_lsb\_minus4+4)} \quad (0\text{-}1)$$

The value of log 2_max_pic_order_cnt_lsb_minus4 is in the range of 0 to 12, inclusive.

Figure 8:
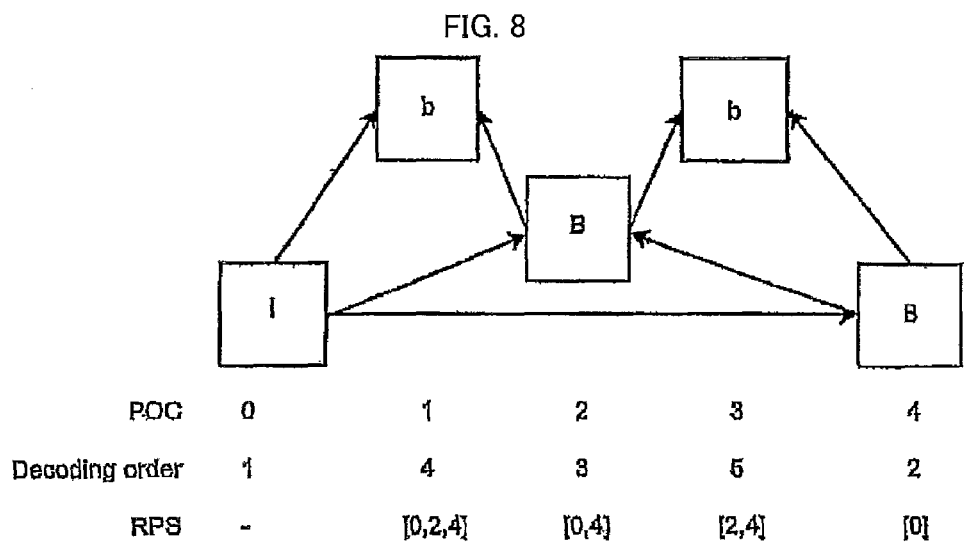
FIG. 8 illustrates POC, decoding order, and RPS.

Reference picture set (RPS) is a set of reference pictures associated with a picture, consisting of all reference pictures that are prior to the associated picture in decoding order, that may be used for inter prediction of the associated picture or any picture following the associated picture in decoding order. FIG. 8 illustrates exemplary POC values, decoding order, and RPS for a temporal prediction structure. In this example the RPS values shown refer to the actual POC values for the RPS. In other cases instead of POC values a difference of POC value of picture with respect to current picture's POC and an indicator signaling if the referred picture is used by current picture and a reference or not may be stored in the RPS.

Since IDR pictures do not require any previous pictures in order to be decoded, a picture order count for the pic_order_cnt_lsb syntax element may be inferred to be 0 thus reducing the bitrate of the bitstream. The first slice in the picture in decoder order is signaled by a first_slice_in_pic_flag being set equal to 1. As a result, the syntax element first_slice_in_pic_flag with a value equal to 1 serves as a boundary to identify the start of an IDR picture in the case where two or more IDR pictures are sent back to back. However, in some cases it is not possible to distinguish between slices belonging to back to back IDR pictures at the video layer. The first such case is if packets arrive out of order at the decoder. The second such case is if the packet containing the first slice of an IDR picture is lost. Also, when all the pictures of a coded video sequence are signaled by intra coding as IDR pictures (e.g., when using an all intra profile) all of the pictures have pic_order_cnt_lsb value of 0.

Thus, to permit the decoder to identify a specific IDR picture from another IDR picture, the system should signal a different pic_order_cnt_lsb value for each. In addition, the BLA picture which is similar to an IDR picture, and has only I slices can signal non-zero value for pic_order_cnt_lsb element.

Referring to FIG. 9, to increase the robustness of the decoder in decoding the bitstream, the pic_order_cnt_lsb syntax element should be signaled for IDR pictures. In the embodiment of the slice header illustrated in FIG. 9, the pic_order_cnt_lsb specifies the picture order count modulo MaxPicOrderCntLsb for the current picture. The length of the pic_order_cnt_lsb syntax element is log 2_max_pic_order_cnt_lsb_minus4+4 bits. The value of the pic_order_cnt_lsb is in the range of 0 to MaxPicOrderCntLsb−1, inclusive.

An alternative technique would include not signaling the pic_order_cnt_lsb syntax element for BLA pictures, thus inferring it to be 0 to be consistent with IDR signalling. As a result, the IdrPicFlag derivation is preferably changed to also include BLA. Also, the IdrPicFlag is preferably renamed as IdrBlaPicFlag. Additionally PicOrderCntVal calculation is preferably modified for BLA pictures. Alternatively, a new flag IdrBlaPicFlag may be included while maintaining the IdrPicFlag.

In general IdrPicFlag will be true or 1 if it is an IDR picture. It will be false or zero otherwise. In one case the variable IdrPicFlag is specified as IdrPicFlag=(nal_unit_type==IDR_W_RADL∥nal_unit_type==IDR_N_LP), where nal_unit_type refers to the NAL unit type.

In general IdrBlaPicFlag will be true or 1 if it is an IDR picture or a BLA picture. It will be false or zero otherwise. In one case the variable IdrBlaPicFlag is specified as IdrBlaPicFlag=(nal_unit_type==IDR_W_RADL∥nal_unit_type==IDR_N_LP∥nal_unit_type==BLA_W_LP∥nal_unit_type==BLA_W_LP∥nal_unit_type==BLA_N_LP), where nal_unit_type refers to the NAL unit type.

This alternative technique may be employed because the BLA picture contains only I slices and may be the first picture in the bitstream in decoding order, or the BLA picture may appear later in the bitstream. Each BLA picture begins a new coded video sequence, and has the same effect on the decoding process as an IDR picture, as previously described. As a result, having a consistent way of signaling pic_order_cnt_lsb value for BLA and IDR pictures will allow them to be handled similarly by the decoder.

Referring to FIG. 10, to increase the consistency of the decoder in decoding the bitstream, and handling IDR and BLA pictures the pic_order_cnt_lsb syntax element may be signaled in the slice header of pictures other than an IDR picture or a BLA picture (e.g., !IdrBLAPicFlag).

Referring to FIG. 11, to increase the consistency of the decoder in decoding the bitstream, and handling IDR and BLA pictures the pic_order_cnt_lsb syntax element may be signaled in the slice header of pictures other an IDR picture or a BLA picture (e.g., !IdrBLAPicFlag). The remaining portion of the slice header may be signaled for pictures other than an IDR picture (e.g., !IdrPicFlag). Thus the remaining portion of the slice header may be signaled for BLA pictures.

Referring to FIG. 12, the pic_order_cnt_lsb syntax element may be at the beginning of the slice header. The pic_order_cnt_lsb field being at the beginning of the slice header more readily enables it to be checked first in slice header to understand which picture the slice belongs to before parsing other syntax elements in the slice. This is useful in environments where pictures are likely to arrive out-of-order and/or be lost.

Scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVCL-0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety. Additional descriptions are described in J. Chen, J. Boyce, Y. Ye, M. M. Hannuksela, "SHVC Draft Text 2," JCTVC-M1008, Incheon, May 2013; G. Tech, K. Wegner, Y. Chen, M. Hannuksela, J. Boyce, "MV-HEVC Draft Text 4 (ISO/IEC 23008-2:201x/PDAM2)," JCTVC-D1004, Incheon, May 2013; J. Chen, J. Boyce, Y. Ye, M Hannuksela, SHVC Draft 3, JCTVCN1008, Vienna, August 2013; and Y. Chen, Y.-K. Wang, A. K. Ramasubromanian, MV-HEVC/SHVC HLS: Cross-layer POC Alignment, JCTVC-N0244, Vienna, July 2013; each of which is incorporated by reference herein in its entirety.

Multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of inter-view statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. Hannuksela, et al., "Common specification text for scalable and multi-view extensions," JCTVC-L0452, Geneva, January 2013, is hereby incorporated by reference herein in its entirety. Tech, et. al. "MV-HEVC Draft Text 3 (ISO/IEC 23008-2:201x/PDAM2)," JCT3V-C1004 d3, Geneva, January 2013, is hereby incorporated by reference herein in its entirety. G. Tech, K. Wegner, Y. Chen, M. Hannuksela, J. Boyce, "MV-HEVC Draft Text 5 (ISO/IEC 203008-2:201x/PDAM2), JCTVC-E1004, Vienna, August 2013, is hereby incorporated by reference herein in its entirety.

Referring to FIG. 13, a video parameter set is a syntax that describes content related to a video sequence. The video parameter set syntax is specified by many syntax elements, several of which are described below.

The vps_extension_offset specifies the byte offset of the next set of fixed-length coded information in the VPS NAL unit, starting from the beginning of the NAL unit. The VPS information for the non-base layer or view may start from a byte-aligned position of the VPS NAL unit, with fixed-length coded information for session negotiation and/or capability exchange. The byte offset specified by vps_extension_offset would then help to locate and access information in the VPS NAL unit without the need of entropy decoding.

The vps_extension_flag equal to 0 specifies that no vps_extension( ) syntax structure is present in the VPS RBSP syntax structure. The vps_extension_flag equal to 1 specifies that the vps_extension( ) syntax structure is present in the VPS RBSP syntax structure. When vps_max_layers_minus1 is greater than 0, vps_extension_flag is equal to 1.

The vps_extension2_flag equal to 0 specifies that no vps_extension_data_flag syntax elements are present in the VPS RBSP syntax structure. Decoders may ignore data that follow the value 1 for vps_extension2_flag in a VPS NAL unit.

In JCTVC-M1008 and JCT3VD-1004 the following restriction is included. When the nal_unit_type value nalUnitTypeA is equal to IDR_W_DLP, IDR_N_LP, BLA_W_LP, BLA_W_DLP or BLA_N_LP for a coded picture, the nal_unit_type value shall be equal to nalUnitTypeA for all VCL NAL units of all coded pictures of the same access unit.

Access unit (AU) refers to a set of network abstraction layer (NAL) units that are associated with each other according to a specified classification rule, that are consecutive in decoding order, and that include the video coding layer (VCL) NAL units of all coded pictures associated with the same output time and their associated non-VCL NAL units. The base layer is a layer in which all VCL NAL units have a nuh_layer_id equal to 0. A coded picture is a coded representation of a picture that includes VCL NAL units with a particular value of nuh_layer_id and that includes all the coding tree units of the picture. In some cases a coded picture may be called a layer component.

Figure 14A:
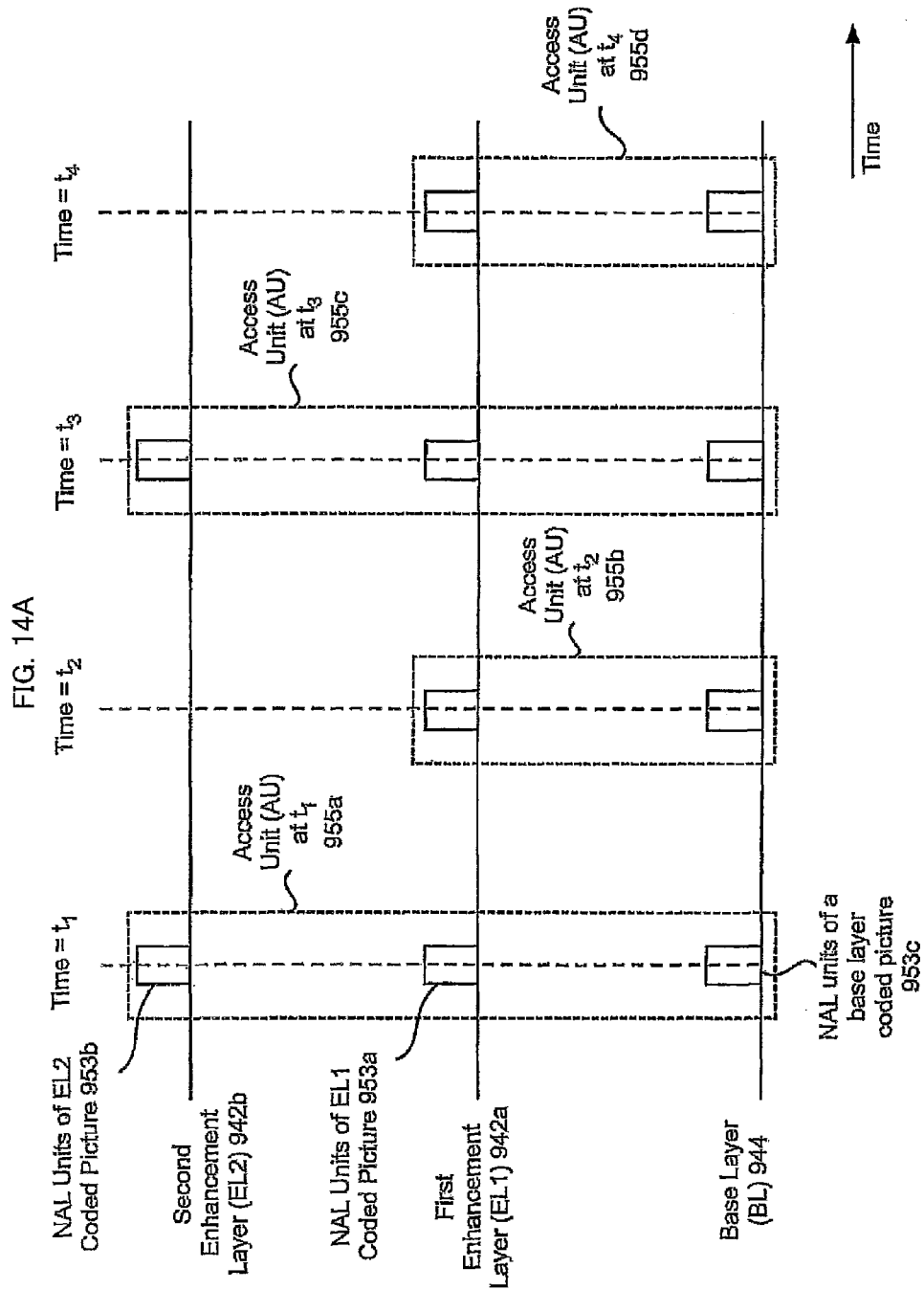
FIG. 14A is a block diagram illustrating structure and timing for network abstraction layer (NAL) units of layers for coded pictures and access units (AUs) when the second enhancement layer (EL2) has a lower picture rate than the base layer (BL) and the first enhancement layer (EL1).

FIG. 14A is a block diagram illustrating structure and timing for network abstraction layer (NAL) units of layers for coded pictures and access units (AUs) when the second enhancement layer (EL2) 942b has a lower picture rate than the base layer (BL) 944 and the first enhancement layer (EL1) 942a. The NAL units of an EL1 coded picture 953a are illustrated along the first enhancement layer (EL1) 942a. The NAL units of an EL2 coded picture 953b are illustrated along the second enhancement layer (EL2) 942b. The NAL units of a base layer coded picture 953c are illustrated along the base layer (BL) 944.

At time t1, the NAL units of an EL1 coded picture 953a, the NAL units of an EL2 coded picture 953b and the NAL units of a base layer coded picture 953c are part of the access unit (AU) 955a. At time t2, the NAL units of an EL1 coded picture 953a and the NAL units of a base layer coded picture 953c are part of the access unit (AU) 955b. At time t3, the NAL units of an EL1 coded picture 953a, the NAL units of an EL2 coded picture 953b and the NAL units of a base layer coded picture 953c are part of the access unit (AU) 955c. At time t4, the NAL units of an EL1 coded picture 953a and the NAL units of a base layer coded picture 953c are part of the access unit (AU) 955d.

Figure 14B:
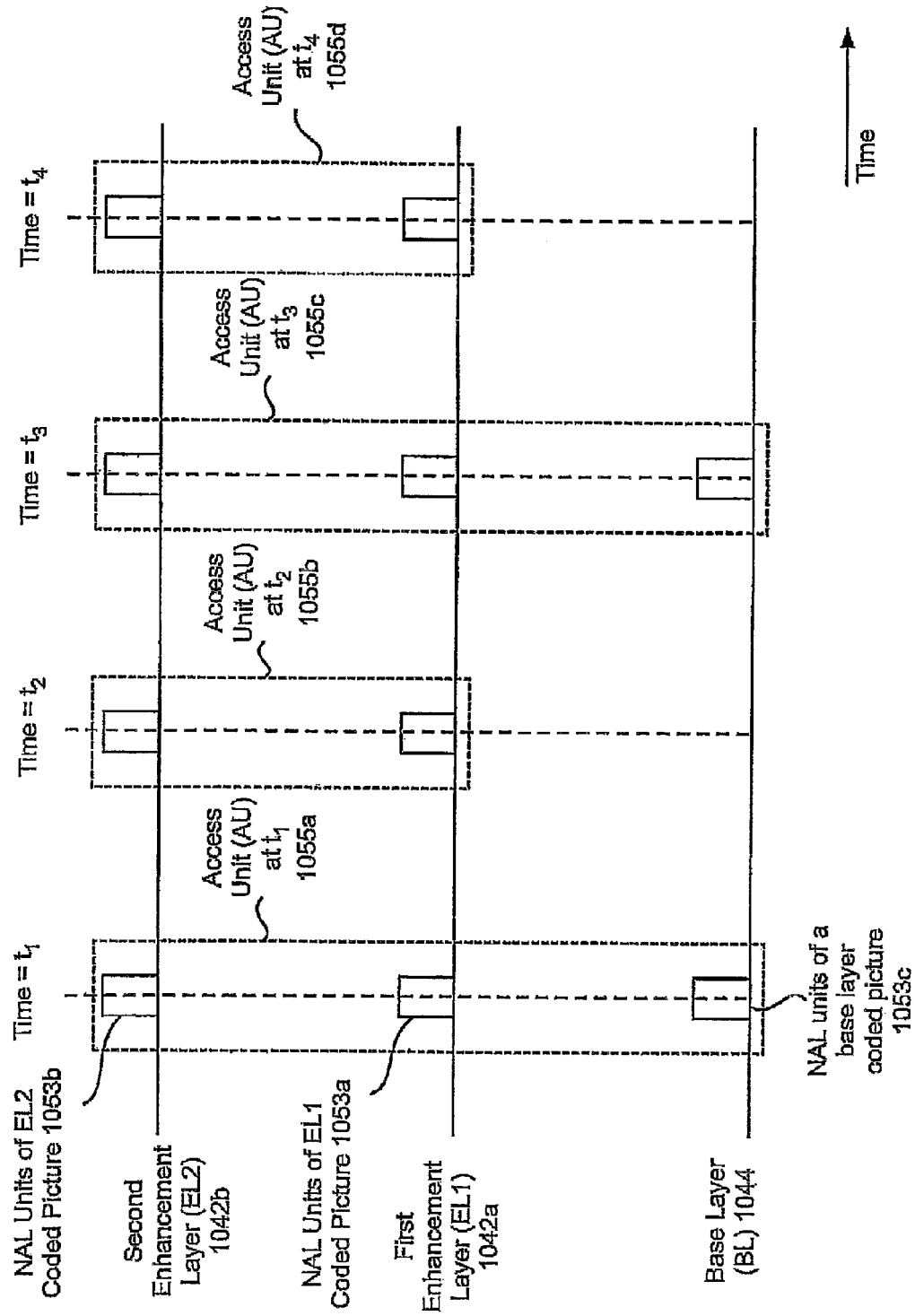
FIG. 14B is a block diagram illustrating structure and timing for network abstraction layer (NAL) units of layers for coded pictures and access units (AUs) when the base layer (BL) has a lower picture rate than the first enhancement layer (EL1) and the second enhancement layer (EL2).

FIG. 14B is a block diagram illustrating structure and timing for network abstraction layer (NAL) units of layers for coded pictures and access units (AUs) when the base layer (BL) 1044 has a lower picture rate than the first enhancement layer (EL1) 1042a and the second enhancement layer (EL2) 1042b. The NAL units of an EL1 coded picture 1053a are illustrated along the first enhancement layer (EL1) 1042a. The NAL units of an EL2 coded picture 1053b are illustrated along the second enhancement layer (EL2) 1042b. The NAL units of a base layer coded picture 1053c are illustrated along the base layer (BL) 1044.

At time t1, the NAL units of an EL1 coded picture 1053a, the NAL units of an EL2 coded picture 1053b and the NAL units of a base layer coded picture 1053c are part of the access unit (AU) 1055a. At time t2, the NAL units of an EL1 coded picture 1053a and the NAL units of a EL2 coded picture 1053b are part of the access unit (AU) 1055b. At time t3, the NAL units of an EL1 coded picture 1053a, the NAL units of an EL2 coded picture 1053b and the NAL units of a base layer coded picture 1053c are part of the access unit (AU) 1055c. At time t4, the NAL units of an EL1 coded picture 1053a and the NAL units of an EL1 coded picture 1053b are part of the access unit (AU) 1055d.

Figure 15:
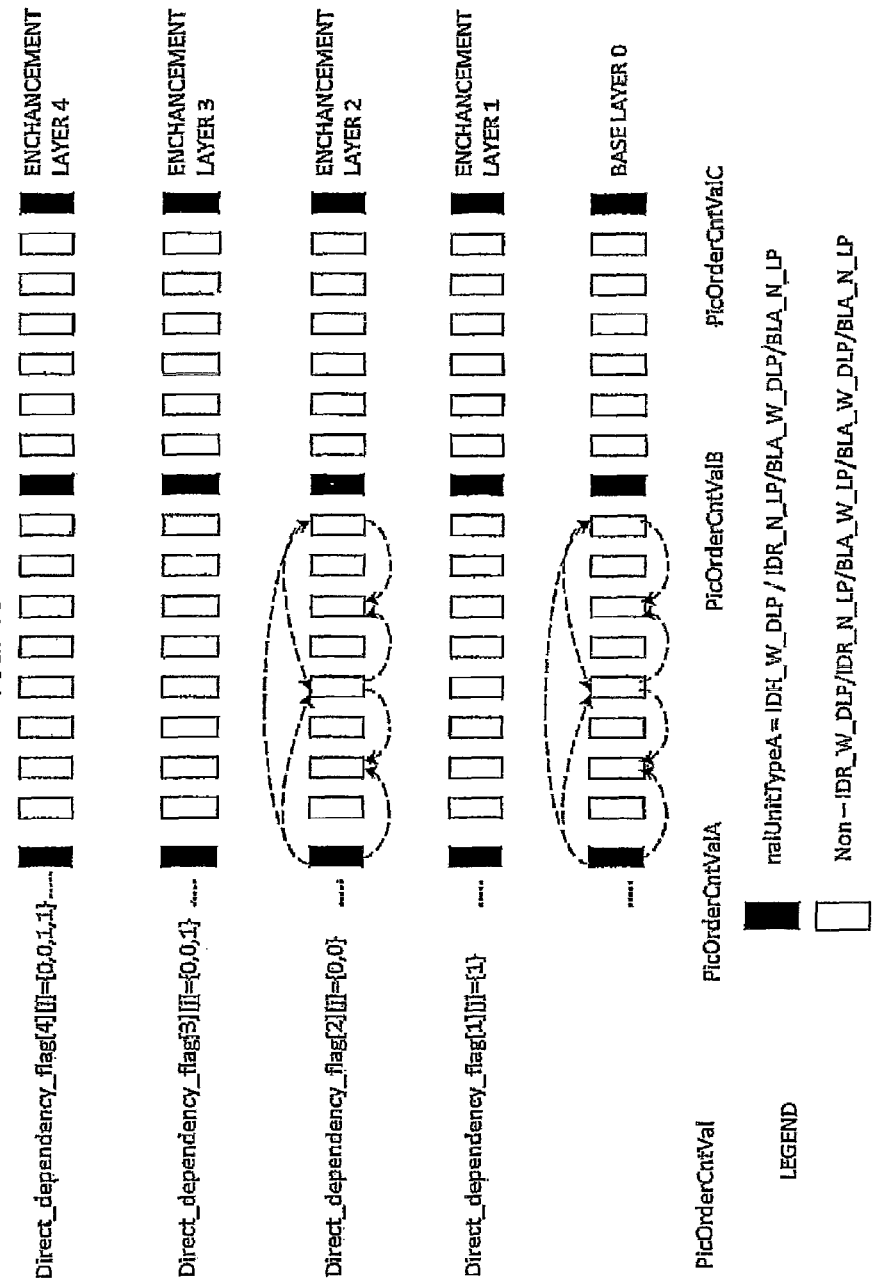
FIG. 15 illustrates a restriction on IDR/BLA pictures.

Referring to FIG. 15, this restriction on the NAL unit type is graphically illustrated. For different types of IDR pictures (e.g., IDR_W_RADL, IDR_N_LP) and BLA pictures (BLA_W_LP, BLA_W_RADL or BLA_N_LP) the restriction is enforced for each of the enhancement layers (e.g., enhancement layers 1, 2, 3, 4) relative to the base layer (e.g., base layer 0). Accordingly, if a picture of the base layer is either an IDR or a BLA picture then each of the enhancement layers for the same PicOrderCntVal is likewise a corresponding IDR or BLA picture.

The use of the base layer and the enhancement layer(s) may be used to simulcast a pair (or more) of video streams within the same video stream. In this manner, for example, the base layer 0 and the enhancement layer 1 may be a first video stream, and the enhancement layer 2, enhancement layer 3, and enhancement layer 4 may be a second video stream. For example the two video streams may have the same video content but may use different bitrates for different base layers and enhancement layers. They may also use different coding algorithm (e.g. HEVC/AVC) for different base layers. In this manner, the enhancement layer 2 does not depend upon either the enhancement layer 1 nor the base layer 0. Also, the enhancement layer 3 and enhancement layer 4 do not depend on either the enhancement layer 1 nor the base layer 0. The enhancement layer 3 may depend on the enhancement layer 2, and the enhancement layer 4 may depend upon both the enhancement layer 3 and the enhancement layer 2. Preferably, an enhancement layer may only depend upon an enhancement layer with a smaller number and not on an enhancement layer with a larger number.

This particular enhancement layer dependency is signaled using the direct dependency flag to indicate for each layer what other layers it may directly depend upon. For example direct_dependency_flag[1][j]={1} indicates that enhancement layer 1 may depend upon base layer 0. For example direct_dependency_flag[2][j]={0,0} indicates that enhancement layer 2 does not depend upon another layer. For example direct_dependency_flag[3][j]={0,0,1} indicates that enhancement layer 3 does not depend upon base layer 0, does not depend upon enhancement layer 1, and may depend upon enhancement layer 2. For example direct_dependency_flag[4][j]={0,0,1,1} indicates that enhancement layer 4 does not depend upon base layer 0, does not depend upon enhancement layer 1, may depend upon enhancement layer 2, and may depend upon enhancement layer 3. With the potential of simulcast configurations, the restriction on the direct_dependency_flag[i][j] may be redefined to permit the IDR and BLA frequency to be different when a simulcast configuration is used. In other words, the IDR and BLA restrictions may be restricted for each of the simulcast streams, but may be independent of one another for each of the simulcast streams.

Figure 16:
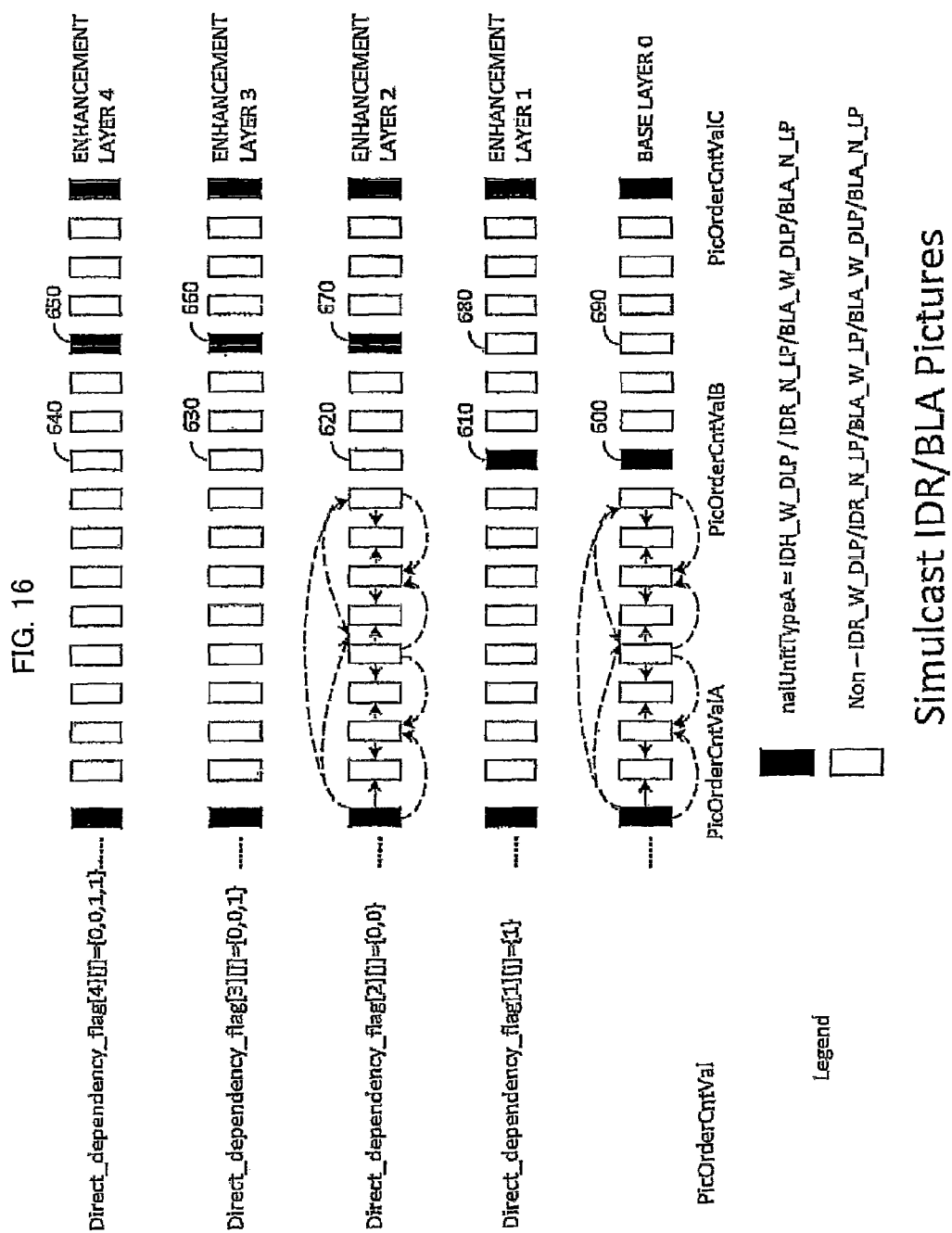
FIG. 16 illustrates simulcast IDR/BLA pictures.

Referring to FIG. 16, a simulcast of two video streams is illustrated, a first video stream including the base layer 0 and the enhancement layer 1; and the second video stream including the enhancement layer 2, the enhancement layer 3, and the enhancement layer 4. As illustrated, the first video stream includes a corresponding pair of IDR/BLA pictures 600, 610 for PicOrderCntVal having a value of PicOrderCntValB, while the second video stream does not include a corresponding set of IDR/BLA pictures 620, 630, 640 for the PicOrderCntVal having a same value of PicOrderCntValB.

As illustrated, the second video stream includes a corresponding set of IDR/BLA pictures 650, 660, 670, while the first video stream does not include a corresponding pair of IDR/BLA pictures 680, 690.

Referring to FIG. 16, in particular this flexibility may be achieved, for example, by considering the direct_dependency_flag[i][j] values signaled for a layer in the VPS extension. The variables IndepLayer[i] may be determined for each layer, namely, whether the layer is independent (e.g., 0) or dependent upon another layer (e.g., 1). This IndepLayer[i] may be derived as follows:

```
for( i =1; i <= vps_max_layers_minus1; i++ )
{
   IndepLayer[i]=0
      if(NumDirectRefLayers[i]==0)
         IndepLayer[i]=1;
}
```

Accordingly, for the example illustrated in FIG. 16 base layer 0 and enhancement layer 2 are both independent layers. Alternatively, the independent layers may be inferred from NumDirectRefLayers[i] without using the additional syntax IndepLayer[i]. For example IndepLayer[i] will be equal to 1 when NumDirectRefLayers [i] is equal to 0. Also IndepLayer[i] will be equal to 0 when NumDirectRefLayers [i] is not equal to 0.

In the syntax, the nuh_layer_id specifies the identifier of the layer should be modified from "when the nal_unit_type value nalUnitTypeA is equal to IDR_W_RADL, IDR_N_LP, BLA_W_LP, BLA_W_RADL or BLA_N_LP for a coded picture with a particular PicOrderCntVal value and within a particular CVS, the nal_unit_type value shall be equal to nalUnitTypeA for all VCL NAL units of all coded pictures with the same particular PicOrderCntVal value and within the same particular CVS" to a modified semantic to enable the simulcast embodiment previously described. The semantics for the nal_unit_type may be modified in any manner, as desired.

Figure 17:
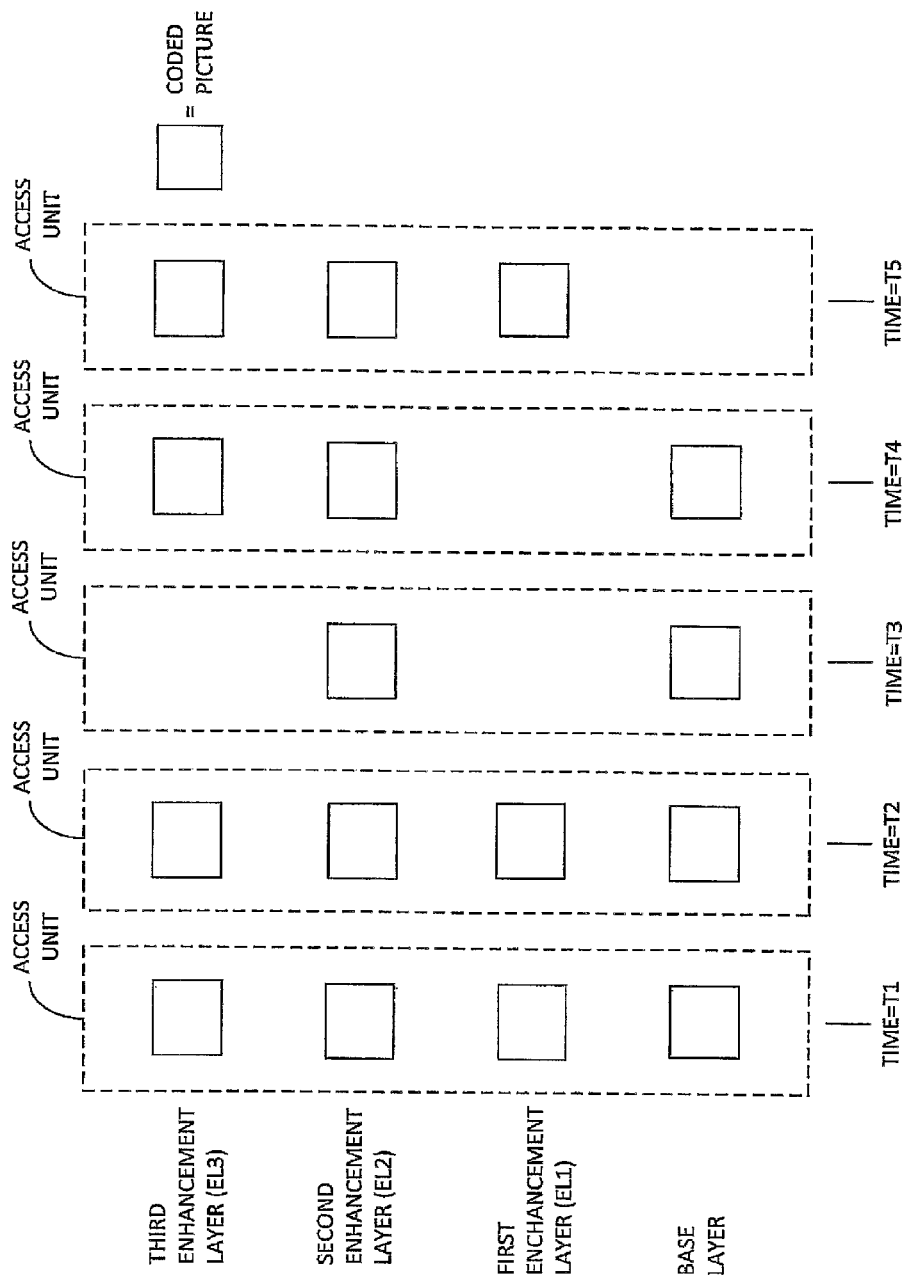
FIG. 17 illustrates access units with a base layer and/or enhancement layer(s).

Referring to FIG. 17, a video stream may include a base layer and one or more enhancement layers (EL1/EL2/EL3). A separate access unit exists for each time (T1/T2/T3/T4/ . . . ) within which are coded pictures for the base layer and/or enhancement layer(s). For example, at time=T1 the corresponding access unit includes a coded picture for the base layer, the first enhancement layer, the second enhancement layer, and the third enhancement layer. For example, at time=T3 the corresponding access unit includes a coded picture for the base layer and the second enhancement layer, while not including a coded picture for the first enhancement layer nor a coded picture for the third enhancement layer. For example, at time T–5 the corresponding access unit includes a coded picture for the first enhancement layer, the second enhancement layer, the third enhancement layer, while not including a coded picture for the base layer. The coded pictures may be, for example, IDR pictures, BLA pictures, CRA pictures, non-IDR pictures, non-BLA pictures, non-CRA pictures, trailing picture, and/or leading pictures. J. Chen, J. Boyce, Y. Ye, M Hannuksela, SHVC Draft 3, JCTVC-N1008, Vienna, August 2013 includes a conformance requirement within section F.8.1.1 that a requirement of bitstream conformance is that PicOrderCntVal shall remain unchanged within an access unit. In other words, each coded picture within the same access unit has the same PicOrderCntVal. Further, IDR pictures included within the base layer (nuh_layer_id=0) have a PicOrderCntVal that is set or inferred to be zero. However, non-IDR Pictures and IDR pictures for non-base layers (nuh_layer_id>0) can have a signaled POC LSB value as slice_pic_order_cnt_lsb syntax element in slice segment header which is then used to derive value of PicOrderCntVal. The PicOrderCntVal is derived from the most significant bit (MSB) and the least significant bit (LSB), where the LSB is signaled in the bitstream. While the LSB may be signaled as zero, such as for a coded picture of an enhancement layer, the PicOrderCntVal may be non-zero because the MSB is determined from the bitstream rather than being directly signaled within the bitstream. Accordingly, it is desirable to have all the coded pictures within the same access unit signaled in a manner that the PicOrderCntVal is ensured to be same but the MSB is not signaled within the syntax, including when the IDR of the base layer is signaled or inferred as having PicOrderCntVal to be 0.

G. Tech, K. Wegner, Y. Chen, M. Hannuksela, J. Boyce, "MV-HEVC Draft Text 5 (ISO/IEC 203008-2:201x/PDAM2), JCTVC-E1004, Vienna, August 2013; J. Chen, J. Boyce, Y. Ye, M Hannuksela, SHVC Draft 3, JCTVC-N1008, Vienna, August 2013; and Y. Chen, Y.-K. Wang, A. K. Ramasubromanian, MV-HEVC/SHVC HLS: Cross-layer POC Alignment, JCTVC-N0244, Vienna, July 2013; defines the syntax and semantics below.

TABLE 2

| slice_segment_header( ) { | Descriptor |
|---|---|
| ... | |
| if( !dependent_slice_segment_flag ) { | |
| i = 0 | |
| if( num_extra_slice_header_bits > i ) { | |
| i++ | |
| poc_reset_flag | u(1) |
| } | |
| ... | |
| } | |

The poc_reset_flag equal to 1 specifies that the derived picture order count for the current picture is equal to 0. The poc_reset_flag equal to 0 specifies that the derived picture order count for the current picture may or may not be equal to 0. It is a requirement of bitstream conformance that when cross_layer_irap_aligned_flag is equal to 1, the value of poc_reset_flag shall be equal to 0. When not present, the value of poc_reset_flag is inferred to be equal to 0.

When the poc_reset_flag is equal to 1, signalled in the slice_segment_header, it indicates that the picture order counts of the coded pictures of the different layers may not be in conformance. Two rules are then applied to remedy the non-conformance. The first rule is that the PicOrderCntVal of each picture that is in the decoded picture buffer and belongs to the same layer as the current picture is decremented by PicOrderCntVal. The second rule is that the PicOrderCntVal is set equal to 0. In this manner, if the current PicOrderCntVal is set to 0 (e.g., the corresponding base layer is an IDR image with a PicOrderCntVal of 0 and it is desirable to set the PicOrderCntVal of the corresponding coded picture of the enhancement layer to 0) then the amount it is decremented is applied to the other pictures in the decoded picture buffer so that they maintain their relative alignment with one another.

However the above two rules are not sufficient to ensure that the PicOrderCntVal will be the same for all coded pictures in the access unit. For this a change in the PicOrderCntVal of prevTid0Pic which is the previous picture in decoding order that has TemporalId equal to 0 and nuh_layer_id equal to nuh_layer_id of the current picture and that is not a RASL picture, a RADL picture, or a sub-layer non-reference picture is required when poc_reset_flag is equal to 1 for the current picture.

With the first rule above only the PicOrderCntVal of each picture in the DPB that belongs to the same layer as the current picture is decremented by the PicOrderCntVal calculated for the current picture when poc_reset_flag is signaled to be equal to 1 in the slice_segment_header of the current picture. However the prevTid0Pic's PicOrderCntlVal is utilized when calculating the POC of the subsequent pictures and for bitstream conformance and thus it also needs to be modified by decrementing its value by the PicOrderCntVal calculated for the current picture when poc_reset_flag is signaled to be equal to 1. This is because in some case the DPB may not contain prevTid0Pic—the previous picture in decoding order that has TemporalId equal to 0 and nuh_layer_id equal to nuh_layer_id of the current picture and that is not a RASL picture, a RADL picture, or a sub-layer non-reference picture. For example the prevTid0Pic may not be in the DPB when TemporalId equal to 0 pictures are coded as IDR or CRA pictures and are only coded less frequently. In this case the prevTid0Pic may not be in the DPB but LSB and MSB values of its PicOrderCntlVal are kept track of during the decoding process. In this case the current operation in the MV-HEVC text draft JCT3V-E1004 and SHVC text draft JCTVC-N1008 will result in the value of PicOrderCntlVal of prevTiod0Pic to be not compensated for the POC reset at the current picture.

Whereas a change in the PicOrderCntVal of prevTid0Pic is described, it is the intention that similar compensation of PicOrderCntVal values by decrementing it by the PicOrderCntVal calculated for the current picture when poc_reset_flag is signaled to to be equal to 1 for the current picture is to be done for following type of pictures:

Any picture which may not be present in the DPB but whose PicOrderCntVal is needed for other subsequent pictures to calculate their PicOrderCntVal correctly Any picture whose PicOrderCntVal is needed to have a value with same relative offset with the current picture's PicOrderCntVal before it is compensated by decrementing it.

As such this technique compensates the PicOrderCntlVal of such pictures as mentioned above by decrementing their PicOrderCntVal by the PicOrderCntVal calculated for the current picture when poc_reset_flag is signaled to be equal to 1 in the slice_segment_header of the current picture.

In addition changes to PicOrderCntVal derivation may be included to correct operation with regards to the PicOrderCntlVal of prevTid0Pic.

Figure 18:
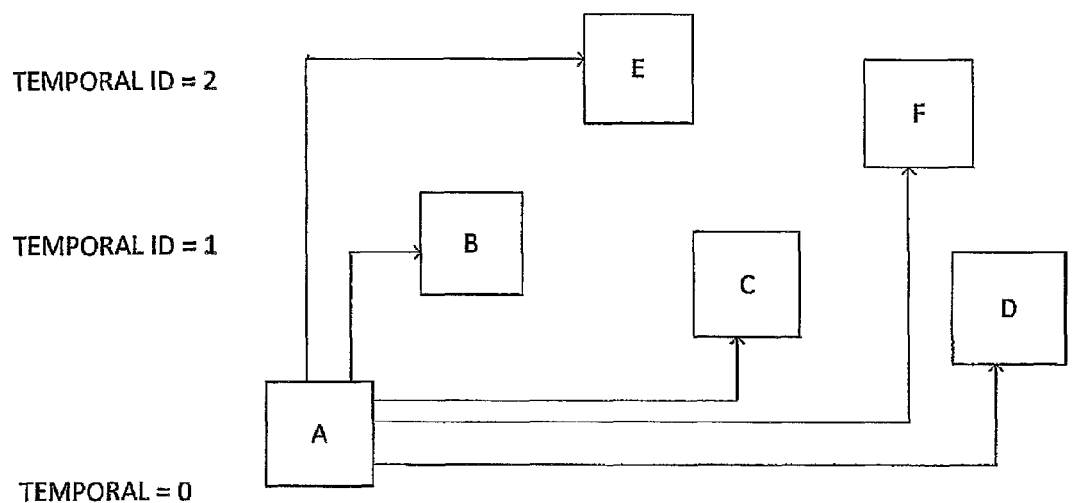
FIG. 18 illustrates TemporalId, prevTid0Pic, and PicOrderCntVal for a plurality of coded pictures.

Referring to FIG. 18, an exemplary illustration of the TemporalId of a set of coded pictures of a layer. For example, coded picture A may have a TemporalId=0 and coded picture A is the prevTid0Pic for coded pictures B, C, D, E, and F. Similarly, the PicOrderCntVal of A acting as prevTid0Pic picture may be used for the calculation of PicOrderCntVal of coded pictures B, C, D, E, and F. By way of example, coded picture A may not be in the DPB when the PicOrderCntVal for coded picture of B, C, D, E, and/or F is calculated when decoding such coded pictures. Although the picture A may not be in DPB its PicOrderCntVal is kept track of by the decoder so as to enable correct calculation of PicOrderCntVal of picture B, C, D, E, and F. Accordingly, it is desirable to decrement the PicOrderCntVal of A, the prevTid0Pic picture in an appropriate manner.

In addition to this changes may be made to the decoding process for reference picture set to utilize derived PicOrderCntVal & (MaxPicOrderCntLsb−1) instead of slice_pic_order_cnt_lsb. As the derived PicOrderCntVal is reset in the case when poc_reset_flag is equal to 1, this change is necessary to use the correct LSB value of the POC which could have been potentially reset.

Further, to account for such changes in the decoded picture buffer when the current picture is not an IRAP picture with NoRaslOutputFlag equal to 1, the variables prevPicOrderCntLsb and prevPicOrderCntMsb are derived as follows. First, let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic. Second, the variable prevPicOrderCntLsb is set equal to prevPicOrderCnt & (MaxPicOrderCntLsb−1). Third, the variable prevPicOrderCntMsb is set equal to prevPicOrderCnt−prevPicOrderCntLsb. Accordingly, when the PicOrderCntVal is set to 0, it is desirable to derive the LSB values from the new PicOrderCntVal values.

The decoding process involving the picture order count provides an output that is PicOrderCntVal, the picture order count of the current picture. The picture order counts are used to identify pictures, for deriving motion parameters in merge mode and motion vector prediction, and for decoder conformance checking. Each coded picture is associated with a picture order count variable, denoted as PicOrderCntVal.

When the current picture is not an IRAP picture with NoRaslOutputFlag equal to 1, the variables prevPicOrderCntLsb and prevPicOrderCntMsb are derived as follows.

(1) Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic.

(2) The variable prevPicOrderCntLsb is set equal to prevPicOrderCnt & (MaxPicOrderCntLsb−1).

(3) The variable prevPicOrderCntMsb is set equal to prevPicOrderCnt−prevPicOrderCntLsb.

The variable PicOrderCntMsb of the current picture is derived as follows:

(1) If the current picture is an TRAP picture with NoRaslOutputFlag equal to 1, PicOrderCntMsb is set equal to 0.

(2) Otherwise, PicOrderCntMsb is derived as follows:

```
if( ( slice_pic_order_cnt_lsb < prevPicOrderCntLsb ) &&
        ( ( prevPicOrderCntLsb − slice_pic_order_cnt_lsb ) >=
( MaxPicOrderCntLsb / 2 ) ) )
  PicOrderCntMsb = prevPicOrderCntMsb + MaxPicOrderCntLsb
    (F-23)
else if( (slice_pic_order_cnt_lsb > prevPicOrderCntLsb ) &&
        ( (slice_pic_order_cnt_lsb − prevPicOrderCntLsb ) >
( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

The PicOrderCntVal is derived as follows: PicOrderCntVal=PicOrderCntMsb+slice_pic_order_cnt_lsb. It is noted that all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

When poc_reset_flag is equal to 1, the following steps apply in the order listed:
(1) The PicOrderCntVal of each picture that is in the DPB and belongs to the same layer as the current picture is decremented by PicOrderCntVal.
(2) The PicOrderCntVal of prevTid0Pic-the previous picture in decoding order that has TemporalId equal to 0 and nuh_layer_id equal to nuh_layer_id of the current picture and that is not a RASL picture, a RADL picture, or a sub-layer non-reference picture, is decremented by PicOrderCntVal.
(3) The PicOrderCntVal of short-term reference pictures in the RPS of the current picture is decremented by PicOrderCntVal.
(4) PicOrderCntVal is set equal to 0.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as PicOrderCnt(picX)=PicOrderCntVal of the picture picX.

The function DiffPicOrderCnt(picA, picB) is specified as DiffPicOrderCnt(picA, picB)=PicOrderCnt(picA)−PicOrderCnt(picB).

The bitstream shall not contain data that result in values of DiffPicOrderCnt(picA, picB) used in the decoding process that are not in the range of $-2^{15}$ to $2^{15}-1$, inclusive. It is noted that let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

In some situations, one or more pictures that would typically be included in the decoded picture buffer may not be part of the decoded picture buffer, such as the result of an error in the transmission of the pictures. As illustrated above, it is desirable to decrement selected prevPicOrderCnt by the PicOrderCntVal to accommodate such situations to decrease decoding errors and to maintain the correct relative relationship between the PicOrderCntVal values of various pictures.

The decoding process for reference picture sets may likewise be modified, which is invoked once per picture, after decoding of a slice header but prior to the decoding of any coding unit and prior to the decoding process for reference picture list construction for the slice. This process may result in one or more reference pictures in the decoded picture buffer being marked as "unused for reference" or "used for long-term reference". This marks only the pictures with the same value of nuh_layer_id and does not mark any picture with a nuh_layer_id different from the current picture. The RPS is an absolute description of the reference pictures used in the decoding process of the current and future coded pictures. The RPS signaling is explicit in the sense that all reference pictures included in the RPS are listed explicitly.

A decoded picture in the DPB can be marked as "unused for reference", "used for short-term reference", or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both).

The variable currPicLayerId is set to be the nuh_layer_id of the current picture.

When the current picture is an IRAP picture with NoRaslOutputFlag equal to 1, all reference pictures with nuh_layer_id equal to currPicLayerId currently in the DPB (if any) are marked as "unused for reference".

Short-term reference pictures are identified by their PicOrderCntVal values. Long-term reference pictures are identified either by their PicOrderCntVal values or their slice_pic_order_cnt_lsb values.

Five lists of picture order count values are constructed to derive the RPS. These five lists are PocStCurrBefore, PocStCurrAfter, PocStFoll, PocLtCurr, and PocLtFoll, with NumPocStCurrBefore, NumPocStCurrAfter, NumPocStFoll, NumPocLtCurr, and NumPocLtFoll number of elements, respectively. The five lists and the five variables are derived as follows:

If the current picture is an IDR picture, PocStCurrBefore, PocStCurrAfter, PocStFoll, PocLtCurr, and PocLtFoll are all set to be empty, and NumPocStCurrBefore, NumPocStCurrAfter, NumPocStFoll, NumPocLtCurr, and NumPocLtFoll are all set equal to 0.

Otherwise, the following applies:

```
for( i = 0, j = 0, k = 0; i < NumNegativePics[ CurrRpsIdx ] ; i++ )
    if( UsedByCurrPicS0[ CurrRpsIdx ][ i ] )
        PocStCurrBefore[ j++ ] = PicOrderCntVal +
DeltaPocS0[ CurrRpsIdx ][ i ]
    else
        PocStFoll[ k++ ] = PicOrderCntVal +
DeltaPocS0[ CurrRpsIdx ][ i ]
NumPocStCurrBefore = j
for( i = 0, j = 0; i < NumPositivePics[ CurrRpsIdx ]; i++ )
    if( UsedByCurrPicS1[ CurrRpsIdx ][ i ] )
        PoeStCurrAfter[ j++ ] = PicOrderCntVal +
DeltaPocS1[ CurrRpsIdx ][ i ]
    else
        PocStFoll[ k++ ] = PicOrderCntVal +
DeltaPocS1[ CurrRpsIdx ][ i ]
NumPocStCurrAfter = j
NumPocStFoll = k
for( i = 0, j = 0, k = 0; i < num_long_term_sps + num_long_term_pics;
i++ ) {
    pocLt = PocLsbLt[ i ]
    if( delta_poc_msb_present_flag[ i ] )
        pocLt += PicOrderCntVal − DeltaPocMsbCycleLt[ i ] *
MaxPicOrderCntLsb − PicOrderCntVal & ( MaxPicOrderCntLsb − 1 )
    if( UsedByCurrPicLt[ i ] ) {
        PocLtCurr[ j ] = pocLt
        CurrDeltaPocMsbPresentFlag[ j++ ] =
        delta_poc_msb_present_flag[ i ]
    } else {
        PocLtFoll[ k ] = pocLt
        FollDeltaPocMsbPresentFlag[ k++ ] =
        delta_poc_msb_present_flag[ i ]
    }
}
NumPocLtCurr = j
NumPocLtFoll = k
``` where PicOrderCntVal is the picture order count of the current picture. A value of CurrRpsIdx in the range of 0 to num_short_term_ref_pic_sets−1, inclusive, indicates that a candidate short-term RPS from the active SPS is being used, where CurrRpsIdx is the index of the candidate short-term RPS into the list of candidate short-term RPSs signalled in the active SPS. CurrRpsIdx equal to num_short_term_ref_pic_sets indicates that the short-term RPS of the current picture is directly signalled in the slice header.

For each i in the range of 0 to NumPocLtCurr−1, inclusive, when CurrDeltaPocMsbPresentFlag[i] is equal to 1, it is a requirement of bitstream conformance that the following conditions apply:

There shall be no j in the range of 0 to NumPocStCurrBefore−1, inclusive, for which PocLtCurr[i] is equal to PocStCurrBefore[j].

There shall be no j in the range of 0 to NumPocStCurrAfter−1, inclusive, for which PocLtCurr[i] is equal to PocStCurrAfter[j].

There shall be no j in the range of 0 to NumPocStFoll−1, inclusive, for which PocLtCurr[i] is equal to PocStFoll[j].

There shall be no j in the range of 0 to NumPocLtCurr−1, inclusive, where j is not equal to i, for which PocLtCurr[i] is equal to PocLtCurr[j].

For each i in the range of 0 to NumPocLtFoll−1, inclusive, when FollDeltaPocMsbPresentFlag[i] is equal to 1, it is a requirement of bitstream conformance that the following conditions apply:

There shall be no j in the range of 0 to NumPocStCurrBefore−1, inclusive, for which PocLtFoll[i] is equal to PocStCurrBefore[j].

There shall be no j in the range of 0 to NumPocStCurrAfter−1, inclusive, for which PocLtFoll[i] is equal to PocStCurrAfter[j].

There shall be no j in the range of 0 to NumPocStFoll−1, inclusive, for which PocLtFoll[i] is equal to PocStFoll[j].

There shall be no j in the range of 0 to NumPocLtFoll−1, inclusive, where j is not equal to i, for which. PocLtFoll[i] is equal to PocLtFoll[j].

There shall be no j in the range of 0 to NumPocLtCurr−1, inclusive, for which PocLtFoll[i] is equal to PocLtCurr[j].

For each i in the range of 0 to NumPocLtCurr−1, inclusive, when CurrDeltaPocMsbPresentFlag[i] is equal to 0, it is a requirement of bitstream conformance that the following conditions apply:

There shall be no j in the range of 0 to NumPocStCurrBefore−1, inclusive, for which PocLtCurr[i] is equal to (PocStCurrBefore[j] & (MaxPicOrderCntLsb−1)).

There shall be no j in the range of 0 to NumPocStCurrAfter−1, inclusive, for which PocLtCurr[i] is equal to (PocStCurrAfter[j] & (MaxPicOrderCntLsb−1)).

There shall be no j in the range of 0 to NumPocStFoll−1, inclusive, for which PocLtCurr[i] is equal to (PocStFoll[j] & (MaxPicOrderCntLsb−1)).

There shall be no j in the range of 0 to NumPocLtCurr−1, inclusive, where j is not equal to i, for which PocLtCurr[i] is equal to (PocLtCurr[j] & (MaxPicOrderCntLsb−1)).

For each i in the range of 0 to NumPocLtFoll−1, inclusive, when FollDeltaPocMsbPresentFlag[i] is equal to 0, it is a requirement of bitstream conformance that the following conditions apply:

There shall be no j in the range of 0 to NumPocStCurrBefore−1, inclusive, for which PocLtFoll[i] is equal to (PocStCurrBefore[j] & (MaxPicOrderCntLsb−1)).

There shall be no j in the range of 0 to NumPocStCurrAfter−1, inclusive, for which PocLtFoll[i] is equal to (PocStCurrAfter[j] & (MaxPicOrderCntLsb−1)).

There shall be no j in the range of 0 to NumPocStFoll−1, inclusive, for which PocLtFoll[i] is equal to (PocStFoll[j] & (MaxPicOrderCntLsb−1)).

There shall be no j in the range of 0 to NumPocLtFoll−1, inclusive, where j is not equal to i, for which PocLtFoll[i] is equal to (PocLtFoll[j] & (MaxPicOrderCntLsb−1)).

There shall be no j in the range of 0 to NumPocLtCurr−1, inclusive, for which PocLtFoll[i] is equal to (PocLtCurr[j] & (MaxPicOrderCntLsb−1)).

The variable NumPicTotalCurr is derived. It is a requirement of bitstream conformance that the following applies to the value of NumPicTotalCurr:

If nuh_layer_id is equal to 0 and the current picture is a BLA picture or a CRA picture, the value of NumPicTotalCurr shall be equal to 0.

Otherwise, when the current picture contains a P or B slice, the value of NumPicTotalCurr shall not be equal to 0.

The RPS of the current picture consists of five RPS lists; RefPicSetStCurrBefore, RefPicSetStCurrAfter, RefPicSetStFoll, RefPicSetLtCurr and RefPicSetLtFoll. RefPicSetStCurrBefore, RefPicSetStCurrAfter, and RefPicSetStFoll are collectively referred to as the short-term RPS. RefPicSetLtCurr and RefPicSetLtFoll are collectively referred to as the long-term RPS. RefPicSetStCurrBefore, RefPicSetStCurrAfter, and RefPicSetLtCurr contain all reference pictures that may be used for inter prediction of the current picture and one or more pictures that follow the current picture in decoding order. RefPicSetStFoll and RefPicSetLtFoll consist of all reference pictures that are not used for inter prediction of the current picture but may be used in inter prediction for one or more pictures that follow the current picture in decoding order.

The derivation process for the RPS and picture marking are performed according to the following ordered steps:

The following applies:

```
(1) for( i = 0; i < NumPocLtCurr; i++ )
        if( !CurrDeltaPocMsbPresentFlag[ i ] )
            if( there is a reference picture picX in the DPB with
    PicOrderCntVal & ( MaxPicOrderCntLsb − 1 ) equal to PocLtCurr[ i ] and
    nuh_layer_id equal to currPicLayerId)
                RefPicSetLtCurr[ i ] = picX
            else
                RefPicSetLtCurr[ i ] = "no reference picture"
        else
            if( there is a reference picture picX in the DPB with
    PicOrderCntVal equal to PocLtCurr[ i ] and nuh_layer_id equal to
    currPicLayerId)
                RefPicSetLtCurr[ i ] = picX
            else
                RefPicSetLtCurr[ i ] = "no reference picture"
    for( i = 0; i < NumPocLtFoll; i++ )
        if( !FollDeltaPocMsbPresentFlag[ i ] )
            if( there is a reference picture picX in the DPB with
    PicOrderCntVal & ( MaxPicOrderCntLsb − 1) equal to PocLtFoll[ i ] and
    nuh_layer_id equal to currPicLayerId)
                RefPicSetLtFoll[ i ] = picX
            else
                RefPicSetLtFoll[ i ] = "no reference picture"
        else
            if( there is a reference picture picX in the DPB with
    PicOrderCntVal equal to
    PocLtFoll[ i ] and nuh_layer_id equal to currPicLayerId)
                RefPicSetLtFoll[ i ] = picX
            else
                RefPicSetLtFoll[ i ] = "no reference picture"
```

(2) All reference pictures that are included in RefPicSetLtCurr and RefPicSetLtFoll and with nuh_layer_id equal to currPicLayerId are marked as "used for long-term reference".

(3) The following applies:

```
for( i =0; i < NumPocStCurrBefore; i++ )
    if( there is a short-term reference picture picX in the DPB
        with PicOrderCntVal equal to PocStCurrBefore[ i ] and
nuh_layer_id equal to currPicLayerId)
        RefPicSetStCurrBefore[ i ] = picX
    else
        RefPicSetStCurrBefore[ i ] = "no reference picture"
for( i = 0; i < NumPocStCurrAfter; i++ )
    if( there is a short-term reference picture picX in the DPB
        with PicOrderCntVal equal to PoeStCurrAfter[ i ] and
nuh_layer_id equal to currPicLayerId)
        RefPicSetStCurrAfter[ i ] = picX
    else
        RefPicSetStCurrAfter[ i ] = "no reference picture"   (F-29)
for( i = 0; i < NumPocStFoll; i++ )
    if( there is a short-term reference picture picX in the DPB
        with PicOrderCntVal equal to PocStFoll[ i ] and nuh_layer_id
equal to currPicLayerId)
        RefPicSetStFoll[ i ] = picX
    else
        RefPicSetStFoll[ i ] = "no reference picture"
```

(4) All reference pictures in the DPB that are not included in RefPicSetLtCurr, RefPicSetLtFoll, RefPicSetStCurrBefore, RefPicSetStCurrAfter, or RefPicSetStFoll and with nuh_layer_id equal to currPicLayerId are marked as "unused for reference".

There may be one or more entries in the RPS lists that are equal to "no reference picture" because the corresponding pictures are not present in the DPB. Entries in RefPicSetStFoll or RefPicSetLtFoll that are equal to "no reference picture" should be ignored. An unintentional picture loss should be inferred for each entry in RefPicSetStCurrBefore, RefPicSetStCurrAfter, or RefPicSetLtCurr that is equal to "no reference picture". A picture cannot be included in more than one of the five RPS lists. It is to be understood that any of the features or elements described herein may be omitted, as desired, or otherwise recombined in a different manner.

A few more variant embodiments are described next. In one exemplary embodiment instead of signaling poc_reset_flag to signal reset of PicOrderCntVal, two separate flags poc_msb_reset_flag and poc_lsb_reset_flag may be signaled as shown in Table (3).

TABLE 3

| slice_segment_header( ) { | Descriptor |
|---|---|
| first_slice_segment_in_pic_flag | u(1) |
| if( nal_unit_type >= BLA_W_LP && nal_unit_type <= RSV_IRAP_VCL23 ) | |
|   no_output_of_prior_pics_flag | u(1) |
| slice_pic_parameter_set_id | ue(v) |
| if( !first_slice_segment_in_pic_flag ) { | |
|   if( dependent_slice_segments_enabled_flag ) | |
|     dependent_slice_segment_flag | u(1) |
|   slice_segment_address | u(v) |
| } | |
| if( !dependent_slice_segment_flag ) { | |
|   i = 0 | |
|   if( num_extra_slice_header_bits > i ) { | |
|     i++ | |
|     poc_msb_reset_flag | u(1) |
|   } | |
|   if( num_extra_slice_header_bits > i ) { | |
|     i++ | |
|     poc_lsb_reset_flag | u(1) |
|   } | |
|   if( num_extra_slice_header_bits > i ) { | |
|     i++ | |

TABLE 3-continued

| slice_segment_header( ) { | Descriptor |
|---|---|
|     discardable_flag | u(1) |
|   } | |
|   for( ; i < num_extra_slice_header_bits; i++ ) | |
|     slice_reserved_flag[ i ] | u(1) |
|   slice_type | ue(v) |
| ... | | poc_msb_reset_flag equal to 1 may specify that the MSB value of the derived picture order count for the current picture is equal to 0. poc_msb_reset_flag equal to 0 may specify that the MSB value of the derived picture order count for the current picture may or may not be equal to 0.

When not present, the value of poc_msb_reset_flag may be inferred to be equal to 0.

poc_lsb_reset_flag equal to 1 may specify that the derived picture order count for the current picture is equal to 0. poc_lsb_reset_flag equal to 0 may specify that the derived picture order count for the current picture may or may not be equal to 0.

When not present, the value of poc_lsb_reset_flag may be inferred to be equal to 0.

When the value of poc_msb_reset_flag is equal to 0, the value of poc_lsb_reset_flag may be required to be equal to 0.

Then the decoding process for PicOrderCntVal may be modified as follows.

When the current picture is not an TRAP picture with NoRaslOutputFlag equal to 1, the variables prevPicOrderCntLsb and prevPicOrderCntMsb are derived as follows. First, let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic. Second, the variable prevPicOrderCntLsb is set equal to prevPicOrderCnt & (MaxPicOrderCntLsb−1). Third, the variable prevPicOrderCntMsb is set equal to prevPicOrderCnt−prevPicOrderCntLsb. Accordingly, when the PicOrderCntVal is set to 0, it is desirable to derive the LSB values from the new PicOrderCntVal values.

The decoding process involving the picture order count provides an output that is PicOrderCntVal, the picture order count of the current picture. The picture order counts are used to identify pictures, for deriving motion parameters in merge mode and motion vector prediction, and for decoder conformance checking. Each coded picture is associated with a picture order count variable, denoted as PicOrderCntVal.

When the current picture is not an TRAP picture with NoRaslOutputFlag equal to 1, the variables prevPicOrderCntLsb and prevPicOrderCntMsb are derived as follows.

(1) Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic.

(2) The variable prevPicOrderCntLsb is set equal to prevPicOrderCnt & (MaxPicOrderCntLsb−1).

(3) The variable prevPicOrderCntMsb is set equal to prevPicOrderCnt−prevPicOrderCntLsb.

The variable PicOrderCntMsb of the current picture is derived as follows:

(1) If the current picture is an TRAP picture with NoRaslOutputFlag equal to 1, PicOrderCntMsb is set equal to 0.

(2) Otherwise, PicOrderCntMsb is derived as follows:

```
if( ( slice_pic_order_cnt_lsb < prevPicOrderCntLsb ) &&
    ( ( prevPicOrderCntLsb – slice_pic_order_cnt_lsb ) >=
( MaxPicOrderCntLsb / 2 ) ) )
    PicOrderCntMsb = prevPicOrderCntMsb + MaxPicOrderCntLsb
(F-23)
    else if( (slice_pic_order_cnt_lsb > prevPicOrderCntLsb ) &&
        ( (slice_pic_order_cnt_lsb – prevPicOrderCntLsb ) >
( MaxPicOrderCntLsb / 2 ) ) )
    PicOrderCntMsb = prevPicOrderCntMsb – MaxPicOrderCntLsb
    else
    PicOrderCntMsb = prevPicOrderCntMsb
```

The PicOrderCntVal is derived as follows: PicOrderCntVal=(poc_msb_reset_flag ? 0: PicOrderCntMsb)+(poc_lsb_reset_flag ? 0: slice_pic_order_cnt_lsb).

It is noted that all IDR pictures that have nuh_layer_id equal to 0 will have PicOrderCntVal equal to 0 since slice_pic_order_cnt_lsb is inferred to be 0 for IDR pictures and prevPicOrderCntLsb and prevPicOrderCntMsb are both set equal to 0.

When poc_reset_flag is equal to 1, the following steps apply:

(1) When poc_msb_reset_flag is equal to 1, the PicOrderCntVal of each picture that is in the DPB and belongs to the same layer as the current picture is decremented by PicOrderCntMsb.

(2) When poc_msb_reset_flag is equal to 1, PicOrderCntVal of prevTid0Pic–the previous picture in decoding order that has TemporalId equal to 0 and nuh_layer_id equal to nuh_layer_id of the current picture and that is not a RASL picture, a RADL picture, or a sub-layer non-reference picture, is decremented by PicOrderCntMsb.

(3) When poc_msb_reset_flag is equal to 1, the PicOrderCntVal of short-term reference pictures in the RPS of the current picture is decremented by PicOrderCntMsb.

(4) When poc_lsb_reset_flag is equal to 1, the PicOrderCntVal of each picture that is in the DPB and belongs to the same layer as the current picture is decremented by slice_pic_order_cnt_lsb.

(5) When poc_lsb_reset_flag is equal to 1, PicOrderCntVal of prevTid0Pic–the previous picture in decoding order that has TemporalId equal to 0 and nuh_layer_id equal to nuh_layer_id of the current picture and that is not a RASL picture, a RADL picture, or a sub-layer non-reference picture, is decremented by slice_pic_order_cnt_lsb.

(6) When poc_lsb_reset_flag is equal to the PicOrderCntVal of short-term reference pictures in the RPS of the current picture is decremented by slice_pic_order_cnt_lsb.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as PicOrderCnt(picX)=PicOrderCntVal of the picture picX.

The function DiffPicOrderCnt(picA, picB) is specified as DiffPicOrderCnt(picA, picB)=PicOrderCnt(picA)–PicOrderCnt(picB).

The bitstream shall not contain data that result in values of DiffPicOrderCnt(picA, picB) used in the decoding process that are not in the range of $-2^{15}$ to $2^{15}-1$, inclusive. It is noted that let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Another variant embodiment is described next. In one exemplary embodiment to achieve cross-layer POC alignment a 32 bit POC decrement value may be signaled. For example this 32 bit POC decrement value may be signaled in slice header extension of base layer IDR picture as shown in Table (4).

TABLE 4

| slice_segment_header( ) { | Descriptor |
|---|---|
| ... | |
| slice_segment_header_extension_length | ue(v) |
| for( i = 0; i < slice_segment_header_extension_length; i++) { | |
| if( i == 0 && nuh_layer_id == 0 && cross_layer_irap_aligned_flag == 0 && | |
| (nal_unit_type == IDR_W_RADL \|\| nal_unit_type == IDR_N_LP)) { | |
| poc_decrement | u(32) |
| i += 4 | |
| } else { | |
| slice_segment_header_extension_data_byte[ i ] | u(8) |
| } | |
| } | |
| } | |
| byte_alignment( ) | |
| } | |

'slice_segment_header_extension_length' may specify the length of the slice segment header extension data in bytes, not including the bits used for signalling slice_segment_header_extension_length itself. It is a requirement of bitstream conformance that slice_segment_header_extension_length shall be equal to or greater than 4 for IDR_W_RADL and IDR_N_LP NAL units when nuh_layer_id and cross_layer_irap_aligned_flag are both equal to 0. The value of slice_segment_header_extension_length shall be in the range of 0 to 256, inclusive.

'poc_decrement' may specify a picture order count decrement to be used for the current picture. When not present, the value of poc_decrement is inferred to be equal to 0.

Then the decoding process for PicOrderCntVal may be modified as follows.

When the current picture is not an TRAP picture with NoRaslOutputFlag equal to 1, the variables prevPicOrderCntLsb and prevPicOrderCntMsb are derived as follows. First, let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic. Second, the variable prevPicOrderCntLsb is set equal to prevPicOrderCnt & (MaxPicOrderCntLsb–1). Third, the variable prevPicOrderCntMsb is set equal to prevPicOrderCnt–prevPicOrderCntLsb. Accordingly, when the PicOrderCntVal is set to 0, it is desirable to derive the LSB values from the new PicOrderCntVal values.

The decoding process involving the picture order count provides an output that is PicOrderCntVal, the picture order count of the current picture. The picture order counts are used to identify pictures, for deriving motion parameters in merge mode and motion vector prediction, and for decoder conformance checking. Each coded picture is associated with a picture order count variable, denoted as PicOrderCntVal.

When the current picture is not an TRAP picture with NoRaslOutputFlag equal to 1, the variables prevPicOrderCntLsb and prevPicOrderCntMsb are derived as follows.

(1) Let prevTid0Pic be the previous picture in decoding order that has TemporalId equal to 0 and nuh_layer_id equal to nuh_layer_id of the current picture and that is not a RASL picture, a RADL picture, or a sub-layer non-reference picture, and let prevPicOrderCnt be equal to PicOrderCntVal of prevTid0Pic.

(2) The variable prevPicOrderCntLsb is set equal to prevPicOrderCnt & (MaxPicOrderCntLsb−1).

(3) The variable prevPicOrderCntMsb is set equal to prevPicOrderCnt−prevPicOrderCntLsb, The variable PicOrderCntMsb of the current picture is derived as follows:

(1) If the current picture is an IRAP picture with NoRaslOutputFlag equal to 1, PicOrderCntMsb is set equal to 0.

(2) Otherwise, PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
( MaxPicOrderCntLsb / 2 ) ) )
    PicOrderCntMsb = prevPicOrderCntMsb + MaxPicOrderCntLsb
(F-23)
else if( (slice_pic_order_cnt_lsb > prevPicOrderCntLsb ) &&
    ( (slice_pic_order_cnt_lsb − prevPicOrderCntLsb ) >
( MaxPicOrderCntLsb / 2 ) ) )
    PicOrderCntMsb = prevPicOrderCntMsb − MaxPicOrderCntLsb
else
    PicOrderCntMsb = prevPicOrderCntMsb
```

The PicOrderCntVal is derived as follows: PicOrderCntVal=PicOrderCntMsb+slice_pic_order_cnt_lsb.

It is noted that all IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

When poc_reset_flag is equal to 1, the following steps:

(1) The PicOrderCntVal of each picture that is in the DPB is decremented by poc_decrement.

(2) The PicOrderCntVal of prevTid0Pic−the previous picture in decoding order that has TemporalId equal to 0 and nuh_layer_id equal to nuh_layer_id of the current picture and that is not a RASL picture, a RADL picture, or a sub-layer non-reference picture, is decremented by poc_decrement.

The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as PicOrderCnt(picX)=PicOrderCntVal of the picture picX.

The function DiffPicOrderCnt(picA, picB) is specified as DiffPicOrderCnt(picA, picB)=PicOrderCnt(picA)−PicOrderCnt(picB).

The bitstream shall not contain data that result in values of DiffPicOrderCnt(picA, picB) used in the decoding process that are not in the range of $-2^{15}$ to $2^{15}-1$, inclusive. It is noted that let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

In all the embodiments described above the modified (by decrementing) PicOrderCntVal value of prevTid0Pic−the previous picture in decoding order that has TemporalId equal to 0 and nuh_layer_id equal to nuh_layer_id of the current picture and that is not a RASL picture, a RADL picture, or a sub-layer non-reference picture will be used when checking the bitstream conformance for the current picture.

In yet another alternative embodiment the following process may be done to confirm a bitstream conforms to the standard specification.

A bitstream of coded data conforming to this Specification shall fulfil all requirements specified in this subclause.

The bitstream shall be constructed according to the syntax, semantics, and constraints specified in this Specification outside of this annex.

The first coded picture in a bitstream shall be an IRAP picture, i.e. an IDR picture, a CRA picture or a BLA picture.

The bitstream is tested by the HRD for conformance as specified in subclause C.1.

For each current picture, let the variables maxPicOrderCnt and minPicOrderCnt be set equal to the maximum and the minimum, respectively, of the PicOrderCntVal values of the following pictures:

The current picture.

The previous picture in decoding order that has TemporalId equal to 0 and that is not a RASL picture, a RADL picture, or a sub-layer non-reference picture. Where the PicOrderCntlVal of this picture is derived as follows:

(1) If poc_reset_flag is equal to 1 for the current picture the PicOrderCntVal of the previous picture in decoding order that has TemporalId equal to 0 and that is not a RASL picture, a RADL picture, or a sub-layer non-reference picture is decremented by PicOrderCntVal of current picture.

(2) If poc_msb_reset_flag is equal to 1 for the current picture the PicOrderCntVal of the previous picture in decoding order that has TemporalId equal to 0 and that is not a RASL picture, a RADL picture, or a sub-layer non-reference picture is decremented by PicOrderCntMsb of current picture.

(3) If poc_lsb_reset_flag is equal to 1 for the current picture the PicOrderCntVal of the previous picture in decoding order that has TemporalId equal to 0 and that is not a RASL picture, a RADL picture, or a sub-layer non-reference picture is decremented by slice_pic_order_cnt_lsb of current picture.

(4) If poc_decrement value is greater than 0, the PicOrderCntVal of the previous picture in decoding order that has TemporalId equal to 0 and that is not a RASL picture, a RADL picture, or a sub-layer non-reference picture is decremented by poc_decrement_value.

(5) If PicOrderCntVal of current picture was decremented by a value decrValue after calculating it based on the decoding process of picture order count as described in JCTVC-L1003 document then the PicOrderCntVal of the previous picture in decoding order that has TemporalId equal to 0 and that is not a RASL picture, a RADL picture, or a sub-layer non-reference picture is decremented by decrValue value.

The short-term reference pictures in the RPS of the current picture.

All pictures n that have PicOutputFlag equal to 1, AuCpbRemovalTime[n] less than AuCpbRemovalTime[currPic], and DpbOutputTime[n] greater than or equal to AuCpbRemovalTime[currPic], where currPic is the current picture.

It is a requirement of the bistream conformance that for each current picture, the value of maxPicOrderCnt−minPicOrderCnt shall be less than MaxPicOrderCntLsb/2.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for decoding a video bitstream comprising the steps of:
   (a) receiving said video bitstream;
   (b) decoding pictures of said video bitstream, where each of said plurality of pictures is associated with a picture order count value, based upon a most significant bit value and a least significant bit value, and associated with a maximum picture order count least significant bit value; and
   (c) identifying a long term reference picture in a decoded picture buffer having said picture order count value of a current picture, wherein
said picture order count value of said current picture being bit-wise ANDed with a value, which is said maximum picture order count least significant bit value minus 1, is equal to a picture order count value of said long-term reference picture for said current picture.

2. A method for encoding a video bitstream comprising the steps of:
   (a) receiving said video bitstream;
   (b) encoding pictures of said video bitstream, where each of said plurality of pictures is associated with a picture order count value based upon a most significant bit value and a least significant bit value, and associated with a maximum picture order count least significant bit value; and
   (c) identifying a long term reference picture in an encoded picture buffer having said picture order count value of a current picture, wherein
said picture order count value of said current picture being bit-wise ANDed with a value, which is said maximum picture order count least significant bit value minus 1, is equal to a picture order count value of said long-term reference picture for said current picture.

* * * * *